United States Patent [19]

Tsuruoka et al.

[11] Patent Number: 4,947,312

[45] Date of Patent: Aug. 7, 1990

[54] NON-RESONANCE TYPE AC POWER SOURCE APPARATUS

[75] Inventors: Tosiaki Tsuruoka, Tsu; Tatsuo Maeoka, Kobe; Masafumi Nakamura, Tsu, all of Japan

[73] Assignee: Matsushita Electric Industrial Co., Ltd., Osaka, Japan

[21] Appl. No.: 342,881

[22] Filed: Apr. 25, 1989

[30] Foreign Application Priority Data

| Apr. 28, 1988 | [JP] | Japan | 63-106391 |
| Jun. 9, 1988 | [JP] | Japan | 63-142146 |
| Jun. 22, 1988 | [JP] | Japan | 63-153937 |
| Jul. 27, 1988 | [JP] | Japan | 63-187218 |

[51] Int. Cl.$^5$ .............................. H02M 7/538
[52] U.S. Cl. .............................. 363/134; 363/26; 363/41
[58] Field of Search .......................... 363/26, 41, 134

[56] References Cited

U.S. PATENT DOCUMENTS

| 3,916,283 | 10/1975 | Burrows | 363/26 |
| 4,287,556 | 9/1981 | Borland | 363/41 |
| 4,339,791 | 7/1982 | Mitchell | 363/134 |
| 4,409,535 | 10/1983 | Hickman | 363/41 |
| 4,628,426 | 12/1986 | Steigerwald | 363/134 |
| 4,709,323 | 11/1987 | Lien | 363/26 |
| 4,716,509 | 12/1987 | Roccucci | 363/26 |

FOREIGN PATENT DOCUMENTS 62-16078 4/1987 Japan .

Primary Examiner—Peter S. Wong
Assistant Examiner—Jeffrey Sterrett
Attorney, Agent, or Firm—Stevens, Davis, Miller & Mosher

[57] ABSTRACT

An AC power source apparatus to be used in an AC corona generator necessary for a de-electrification/separation process, which is one of electrographic image forming processes, or in a case where a low frequency AC power source is required, has a construction such that a high-frequency pulse, whose time ratio is modulated trapezoidally with time, is applied to switching elements connected in inverse-series across a primary winding of a transformer, an inductance element having a regenerative diode and a reset winding is inserted between an intermediate tap of the primary winding of the transformer and a DC power supply input terminal, and an LC filter is formed by stray capacitance of a secondary winding of the transformer, whereby a desired output waveform can be produced with a simple circuit construction.

10 Claims, 21 Drawing Sheets (a)
OUTPUT PULSE WITH
SMALL DUTY-FACTOR (b)
OUTPUT WAVEFORM (c)
OUTPUT PULSE WITH
LARGE DUTY-FACTOR (d)
OUTPUT WAVEFORM (a)

(b)

F I G. 34
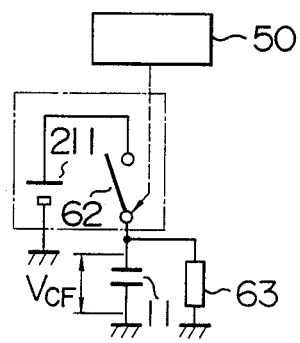
F I G. 35
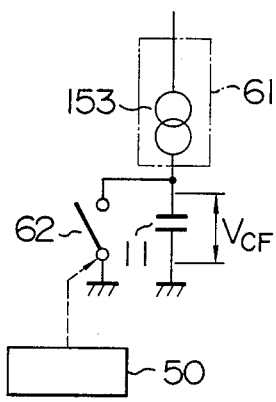
F I G. 36
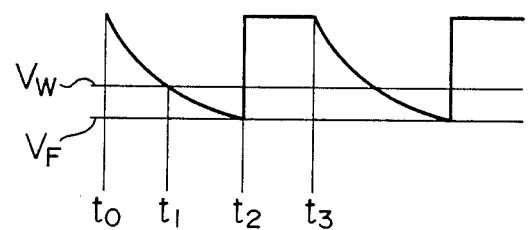
F I G. 37
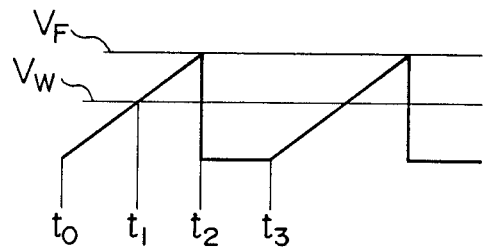

NON-RESONANCE TYPE AC POWER SOURCE APPARATUS

BACKGROUND OF THE INVENTION

The present invention relates to an AC power source apparatus for use where an AC power source having an output frequency in a range from a commercial-base frequency of 50 Hz/60 Hz to a low frequency of the order of several kHz is required. The invention can be used, for example, in AC corona generators used in a de-electrification/separation process, which is one of electrographic image forming processes performed in electronic duplicators, laser beam printers or the like; in electric motors; in uninterruptible power supplies; and so on.

As one of AC power supply means in the prior art, a voltage resonance type DC-AC inverter has been disclosed in JP-B-62-16078. FIG. 1 is a circuit diagram of the voltage resonance type DC-AC inverter, and FIG. 2 is a graph showing waveforms at various points depicted in FIG. 1. Referring now to FIG. 1, a DC power source 14 is connected between power supply terminals 12 and 13, one terminal 12 being connected to an intermediate tap of a primary winding of a transformer 1 through a primary winding of an inductance element 5 having a reset winding. A resonance capacitor 11 is connected across the primary winding of the transformer 1 and connected to the other power supply terminal 13 via a common junction point of a pair of switching transistors 2 and 3 and through the collector-emitter circuits of both switching transistors 2 and 3. A pulse width control oscillator 4 generates a pulse signal having a predetermined frequency and a variable pulse width. The pulse signal is fed to the bases of the transistors 2 and 3 to turn on the transistors alternately. One end of a secondary winding of the inductance element 5 is connected to the power supply terminal 12 through a diode 6 arranged in series in the forward direction. The other end of the secondary winding 12 of the inductance element 5 is connected to the power supply terminal 13. The transformer 1 is provided with a gap for adjusting inductance so that a resonance frequency produced by a combination of the transformer 1 and the resonance capacitor 11 coincides with an oscillation frequency of the pulse width control oscillator 4. In the aforementioned construction, a sine-wave AC voltage $V_{AC}$ can be produced in the secondary winding of the transformer 1 by turning on the transistors 2 and 3 alternately through output pulse signals generated from the pulse width control oscillator 4.

As shown in FIG. 3, the pulse width control oscillator 4 is constituted by an oscillation circuit 15, a pulse width modulation circuit 16 and a distribution circuit 17, the output pulse width of the pulse width modulation circuit 16 being controlled by a control signal 18. When the output pulse signals from the pulse width control oscillator 4, for example, rectangular pulse signals having waveforms (a) and (c) as shown in FIG. 2, are respectively applied to the bases of the transistors 2 and 3, the collector voltages of the transistors 2 and 3 change as shown by waveforms (b) and (d) in FIG. 2. Because the current in the primary winding of the inductance element 5 is cut off while the transistors 2 and 3 are turned off simultaneously, excessive voltages are apt to be induced across the primary winding and at the respective collectors of the transistors 2 and 3. However, a voltage Vid is induced across the secondary winding of the inductance element 5, so that when the voltage Vid exceeds the voltage Vdc of the DC power source 14, the excessive energy of the voltage Vid is regeneratively fed back to the DC power source 14 through the diode 6. Accordingly, the peak values of the collector voltages of the transistors 2 and 3 are limited to predetermined values. Thus, the conventional system is constructed so that the sine-wave output voltage Vac produced across the secondary winding of the transformer 1 can be changed suitably by changing the pulse width of the output signals generated by the pulse width control oscillator 4

However, the conventional system requires wave shaping of the output voltage by resonance due to the capacitor 11 and the inductance of the transformer 1. Accordingly, the capacitor 11 must have a large capacity. When the capacitor 11 has a sufficiently large capacity to assure stable resonance with a certain degree of Q, the loss due to the resonance current and the DC resistance components of the primary windings of the inductance element 5 and the transformer 1 as well as the dielectric loss of the capacitor 11 become large. These losses cause deterioration of the power supply efficiency. Further, stabilization of resonance frequency and improvement of Q are required for keeping the predetermined output waveform stable. Further, adjustment of the core gap of the transformer 1 and adjustment of the capacitor 11 are required for tuning the oscillation frequency to the resonance frequency. Accordingly, the conventional system is inferior not only in productivity but also in efficiency of the transformer 1 because of existence of the gap thereof. Consequently, the efficiency of power supply is apt to be deteriorated. Further, the output frequency cannot be changed easily, because tuning is required. Because $\mu$ of the core and the equivalent gap vary with the change of temperature and the passage of time, tuning becomes difficult. Consequently, the conventional system has a disadvantage in that the waveform and amplitude of the output voltage cannot be kept constant. Further, in the case where a time ratio is changed corresponding to the change of the input and load, the peak factor of the output waveform is changed as follows. When the time ratio of the output pulse signal from the pulse-width-modulated oscillator 4 is small as shown in FIG. 4(a), the peak factor is heightened as shown in FIG. 4(b). When the time ratio of the output pulse signal is large as shown in FIG. 4(c), the peak factor is lowered as shown in FIG. 4(d). Consequently, the conventional system has a disadvantage in that the peak factor of the output wave varies widely according to the change in the input and the change in the load.

Further, in general, two types of output waveforms, that is, sine wave and rectangular wave, are used as an AC power supply for electrography. However, the conventional system has an disadvantage in that the rectangular wave cannot be used because the conventional system utilizes resonance. Further, it is difficult to make the switching frequency of the transistor high, because, in general, the switching frequency is a low frequency like the frequency of the output voltage. Accordingly, a large inductance is required. Consequently, the conventional system has a disadvantage in that a small-scale and low-cost system cannot be provided.

SUMMARY OF THE INVENTION

It is therefore an object of the present invention to provide an AC power source apparatus which is free from the aforementioned disadvantages.

In order to attain the above object, the present invention is intended to provide an AC power source apparatus which comprises: a DC power source; a transformer having primary and second windings, the primary winding being provided with an intermediate tap; first and second switching elements connected in inverse-series across the primary winding of the transformer; an inductance element having a series connection of a reset winding and a regenerative diode; the DC power source and the inductance element being connected in series between the intermediate tap of the primary winding and a junction of the first and second switching elements; a filtering capacitor connected in parallel with a selected one of the primary and secondary windings of the transformer; and means for applying a time-ratio-modulated pulse to the first and second switching elements alternately at every half output period of the transformer.

As a constituent element of the pulse application means in the above-mentioned AC power source apparatus according to the present invention, the present invention is intended to provide an amplitude-controlled trapezoidal wave generating circuit which comprises: first and second current sources which are connected in series and in parallel with a wave-forming capacitor, respectively, and are capable of being turned on and off optionally, and whose current values are variable in interlinked relation with each other; a voltage detection means for detecting the voltage of the wave-forming capacitor; and a timing control means triggerable by an output of the voltage detection means for generating a first and second timing signals; whereby the end timing of the operation of the first current source and the start timing of the operation of the second current source are controlled by the timing control means, and the end timing of the operation of the second current source is controlled by a voltage level of the wave-forming capacitor.

BRIEF DESCRIPTION OF THE DRAWINGS

Other features and advantages of the present invention will be apparent from the following description taken in connection with the accompanying drawings, wherein;

FIGS. 34 and 35 are partial diagrams of the timing control circuit, showing examples of a charge means 61, a capacitor 11 and a switching element 62; and FIGS. 36 and 37 are waveform diagrams respectively showing the operations of the timing control means depicted in FIGS. 34 and 35.

DESCRIPTION OF THE PREFERRED EMBODIMENTS

An embodiment of the present invention will be described hereunder with reference to the drawings.

Figure 1:
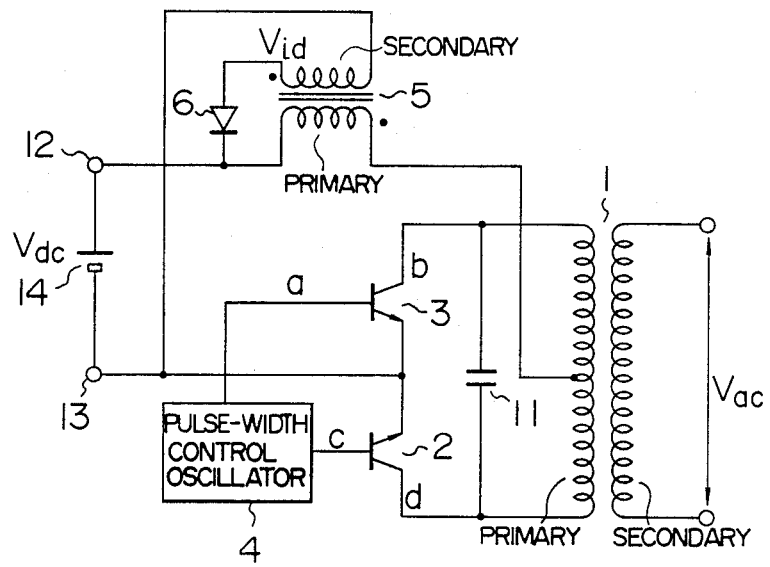
FIG. 1 is a circuit diagram of a conventional voltage resonance type DC-AC inverter.
Figure 2:
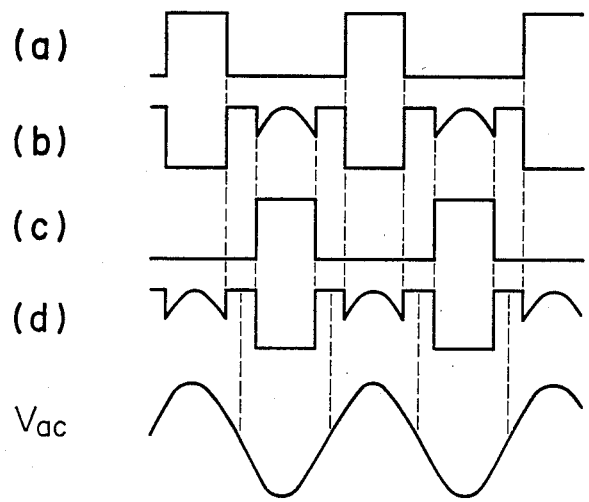
FIG. 2 is a graph showing waveforms at respective operation points depicted in FIG. 1.
Figure 3:
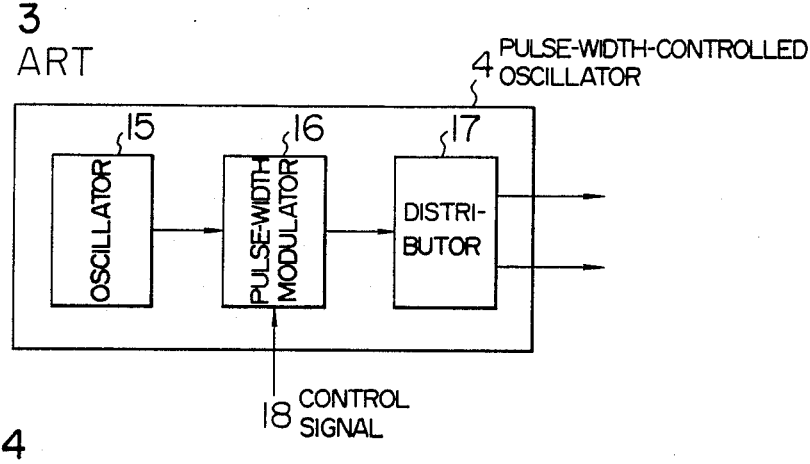
FIG. 3 is a block diagram of the pulse width control oscillator.
Figure 4:
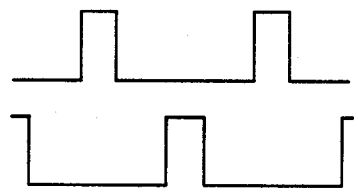
FIGS. 4a–d are waveform diagram showing the relation between the output from the pulse width control oscillator and the output from the DC-AC inverter.
Figure 4:
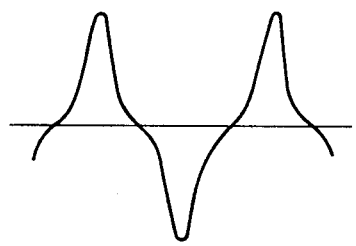
Figure 4:
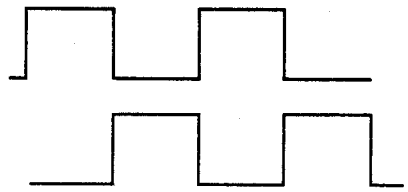
Figure 4:
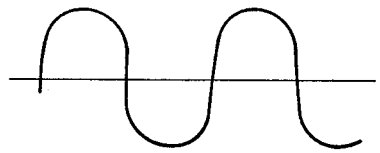
Figure 5:
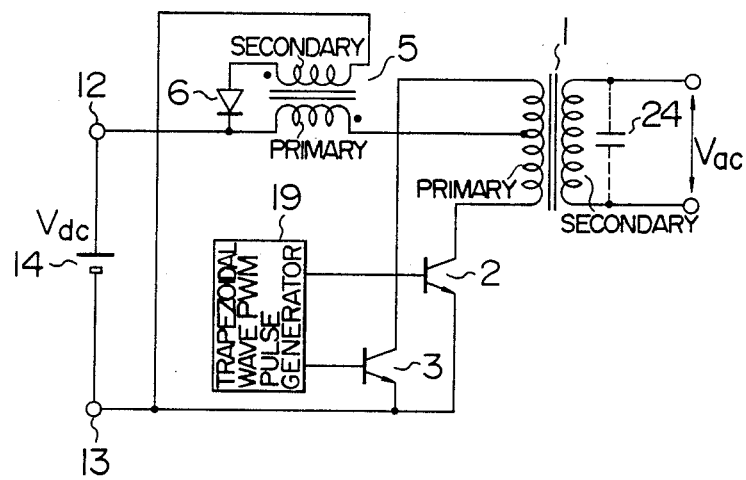
FIG. 5 is a circuit diagram of an embodiment of the AC power source apparatus according to the present invention.

FIG. 5 shows the circuit configuration of an embodiment of the AC power source apparatus according to a first aspect of the present invention.

In FIG. 5, a DC power source 14 is connected between power supply terminals 12 and 13, one power supply terminal 12 being connected to an intermediate tap of a primary winding of a transformer 1 through a primary winding of an inductance element 5 including a reset winding. The primary winding of the transformer 1 is connected to the other power supply terminal 13 through the respective collector-emitter circuits of a pair of transistors 2 and 3 which serve as switching elements. A trapezoidal wave PWM pulse generator 19 generates a high-frequency pulse signal having a time ratio trapezoidally modulated with time. The pulse signal is fed to the respective bases of the transistors 2 and 3 to turn on the transistors alternately. One end of a secondary winding of the inductance element 5 is connected to the power supply terminal 12 through a diode 6 provided in series in the forward-direction. The other end of the secondary winding 12 of the inductance element 5 is connected to the power supply terminal 13. A capacitor 24 is added equivalently across the secondary winding of the transformer 1. Although the embodiment has shown the case where the transistors are used as switching elements, it is a matter of course that the invention is not limited to the specific embodiment and that the invention is applicable to the case where FETs or the like are used as switching elements.

Figure 6:
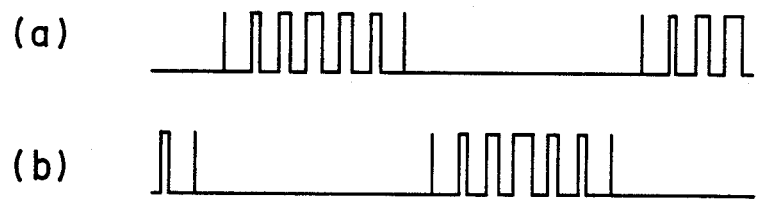
FIG. 6 is a waveform diagram showing the output from the trapezoidal wave PWM pulse generator.
Figure 7:
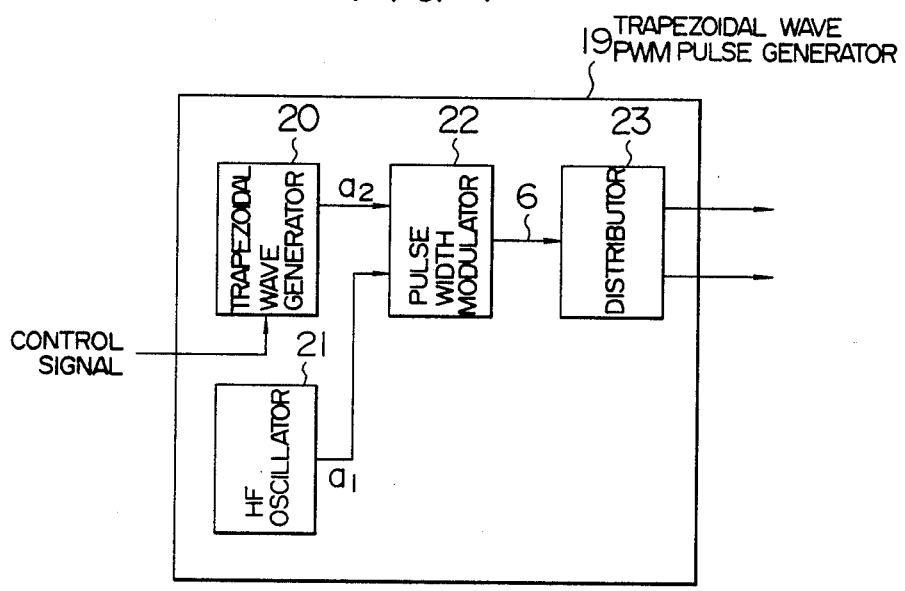
FIG. 7 is a block diagram of the trapezoidal wave PWM pulse generator.
Figure 8:
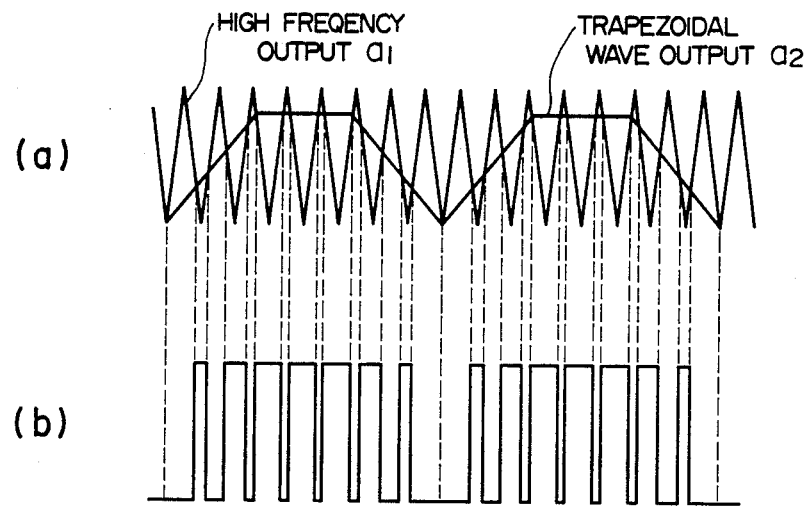
FIG. 8 is a diagram of waveforms at respective points depicted in FIG. 7.

As shown in FIG. 7, the trapezoidal wave PWM pulse generator 19 is composed of a trapezoidal wave generating circuit 20, a high-frequency oscillation circuit 21, a pulse width modulation circuit 22, and a distribution circuit 23. As shown in FIG. 8, a high-frequency pulse signal (b) having a time ratio modulated by trapezoidal wave is obtained from a trapezoidal wave output $a_2$ of the trapezoidal wave generating circuit 20 and a high-frequency output $a_1$ of the high-frequency oscillation circuit 21 through the pulse width modulation circuit 22 which is constituted by a comparator. The modulated high-frequency pulse signal (b) as shown in FIG. 8 is distributed at every half output period by the distribution circuit 23 to thereby obtain two high-frequency pulse signals (a) and (b) as shown in FIG. 6.

The high-frequency pulse signals are supplied respectively to the respective bases of the transistors 2 and 3 to thereby turn on the transistors 2 and 3 alternately. High-frequency components are removed by an LC filter formed by the inductance element 5 and the equivalent capacitor 24 of the secondary winding of the transformer 1. As a result, a predetermined trapezoidal wave output voltage Vac can be produced across the secondary winding of the transformer 1.

Figure 9:
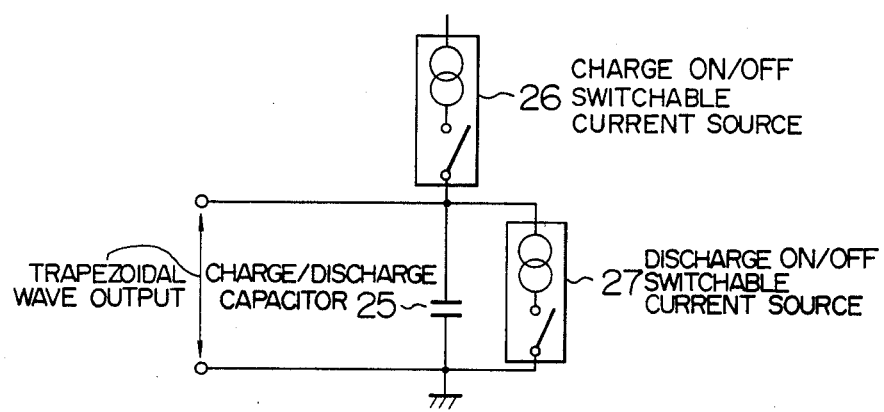
FIG. 9 is a block diagram of the trapezoidal wave generating circuit.

FIG. 9 shows the trapezoidal wave generating circuit 20 depicted in FIG. 7. The trapezoidal wave generating circuit 20 is constructed so that the amplitude of the trapezoidal wave can be determined variably, and, at the same time, the rising/falling slope of the trapezoidal wave can be determined suitably and variably.

The operation of the trapezoidal wave generating circuit shown in FIG. 9 will be explained by reference to the waveform of FIG. 10.

Figure 10:
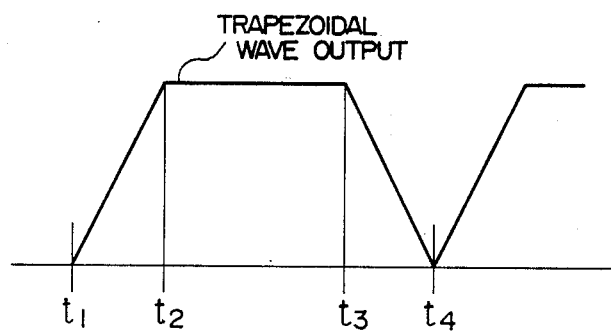
FIG. 10 is a diagram showing the trapezoidal wave.
Figure 11:
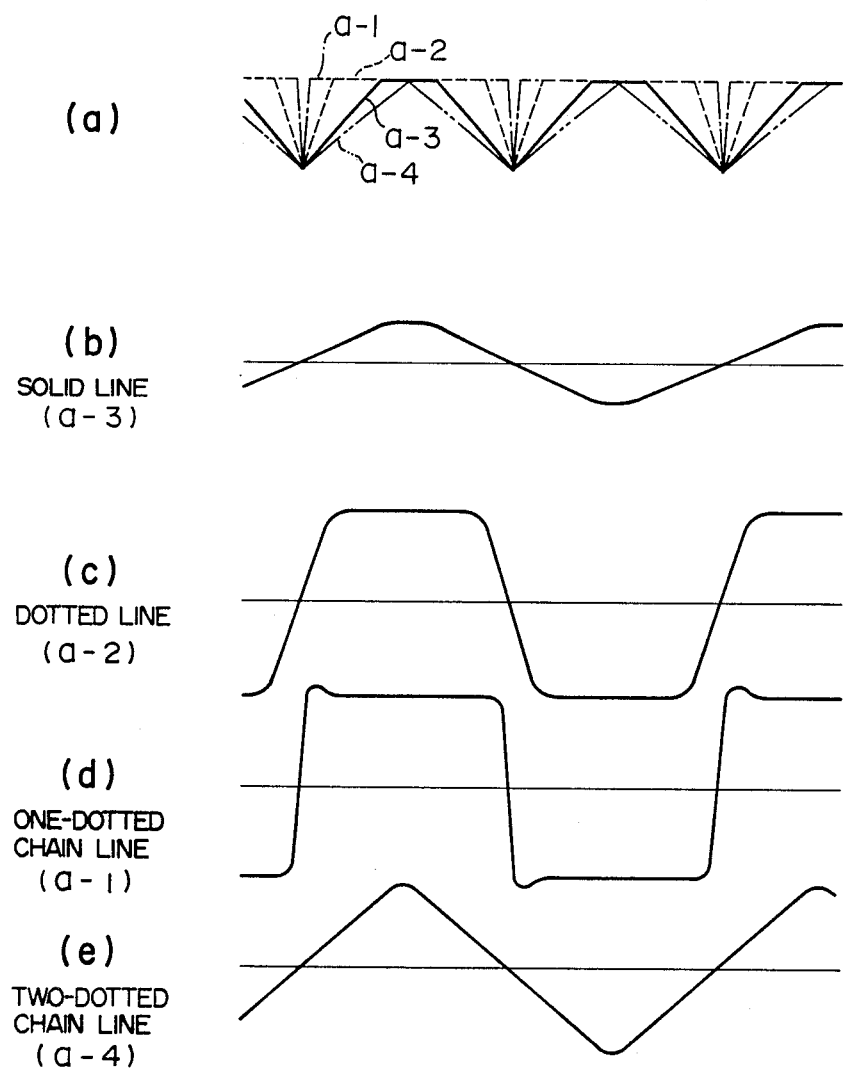
FIGS. 11a–e are diagrams showing the relation between the trapezoidal wave output and the Vac output.

In the case where the trapezoidal wave generating circuit 20 is composed of a charge/discharge capacitor 25, a charge ON/OFF switchable current source 26 (hereinafter referred to as "charge current source") connected in series with the capacitor 25 for charging the capacitor 25, and a discharge ON/OFF switchable current source 27 (hereinafter referred to as "discharge current source") connected in parallel with the capacitor 25 for discharging the capacitor 25, the charge/discharge capacitor 25 is charged by a constant current at time $t_1$ as shown in FIG. 10 under the condition that the charge current source 26 is in the ON state and the discharge current source is in the OFF state. As a result, the voltage across the charge/discharge capacitor 25 increases linearly. If the charge current source 26 is turned off at time $t_2$ while the discharge current source 27 is kept OFF, the voltage is kept constant because neither charging nor discharging is carried out. If the discharge current source 27 is turned on at time $t_3$ while the charge current source 26 is kept OFF, the voltage is lowered linearly because discharging occurs with a constant current. If the current value of the charge current source 26 is established to be equal to the current value of the discharge current source 27, the slope between $t_1$ and $t_2$ is made equal to the slope between $t_3$ and $t_4$, so that a trapezoidal wave output can be obtained across the charge/discharge capacitor 25 by repeating the aforementioned operation. The output of the transformer 1 is changed corresponding to the trapezoidal wave output as follows. By changing the ratio of $t_2$-$t_3$ to $t_1$-$t_2$ (or $t_3$-$t_4$), the rising/falling slope of the trapezoidal wave output can be changed suitably as shown by the characteristic curves a-1 to a-4 in FIG. 11. In short, a suitable one of the rectangular wave (a-1), trapezoidal wave (a-2), pseudo-sine wave (a-3) and triangular wave (a-4) can be obtained. In this case, output voltages as shown in the diagrams (b), (c), (d) and (e) in FIG. 11 can be obtained. Further, by changing the current values of the charge/discharge current source 26 and 27 cooperatively, the amplitude of the trapezoidal wave can be changed while the figure of the trapezoidal wave is kept similar. Accordingly, the amplitude of the output voltage from the transformer 1 can be changed while the figure of the output voltage is kept similar. In short, the waveform of the output voltage is not affected by the change of the amplitude of the output voltage.

Figure 12:
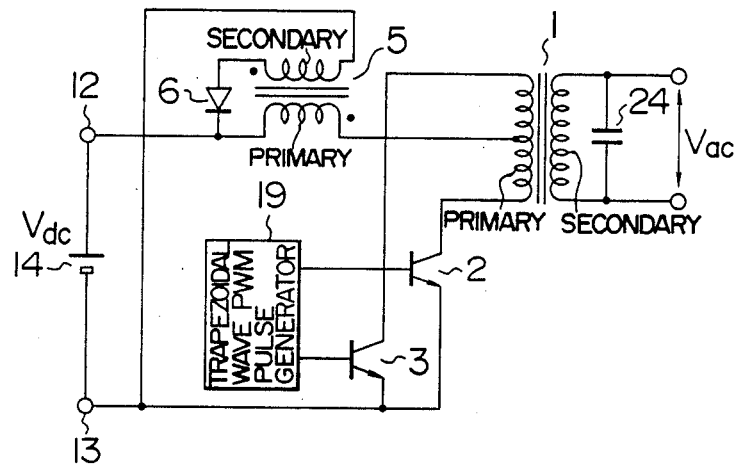
FIGS. 12, 13, 15 and 18 are circuit diagrams showing other embodiments of the AC power source apparatus according to the present invention.

FIG. 12 shows another embodiment of the trapezoidal wave PWM pulse generator in which a capacitor 24 serving as an LC filter capacitor is connected in parallel with a winding of the transformer 1 to thereby improve a filtering function in the case where the stray capacitance of the winding of the transformer 1 is small. Although FIG. 12 shows the case where the filter capacitor 24 is connected in parallel with the secondary winding of the transformer 1, the same effect can be obtained in the case where the capacitor 24 is connected in parallel with the primary winding.

Figure 13:
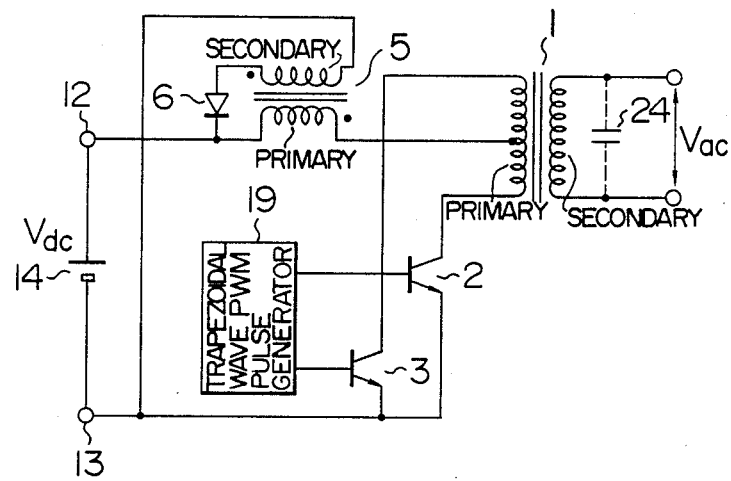
Figure 14:
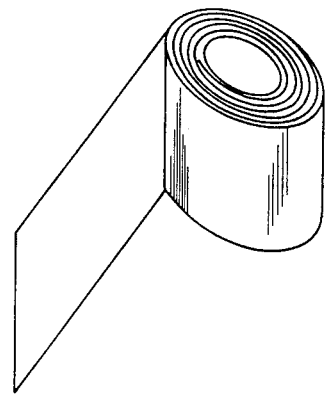
FIG. 14 is a perspective view of a foil-winding transformer.

FIG. 13 shows a further embodiment of the trapezoidal wave PWM pulse generator in which a foil-winding transformer having stray capacitance improved by an increase in the facing area of the winding as shown in FIG. 14 is provided to use the stray capacitance of the winding of the transformer 1 as an LC filter capacitor.

Figure 15:
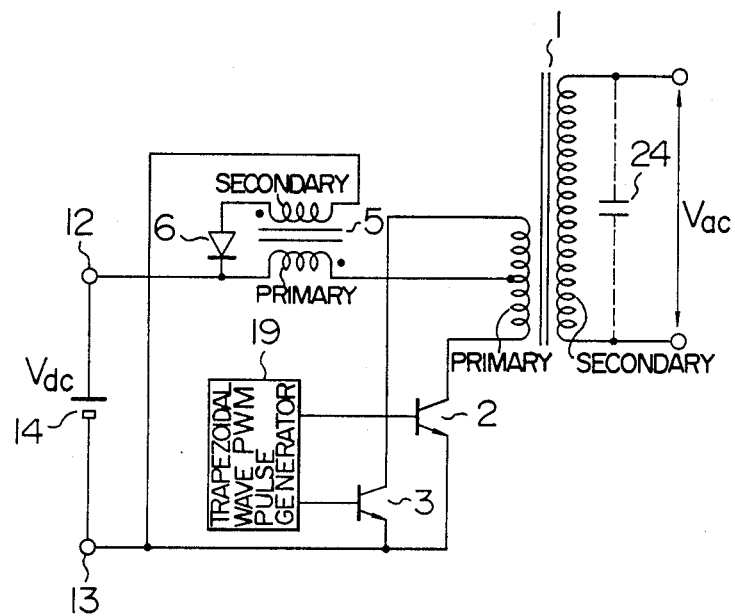
Figure 16:
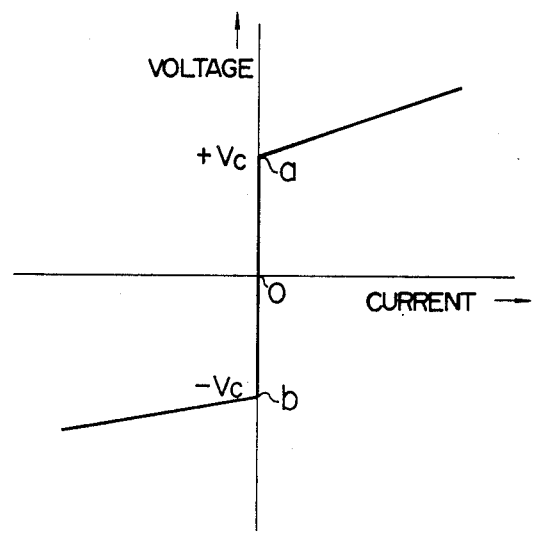
FIG. 16 is a graph showing the voltage-current characteristic of an AC corona generator.
Figure 17:
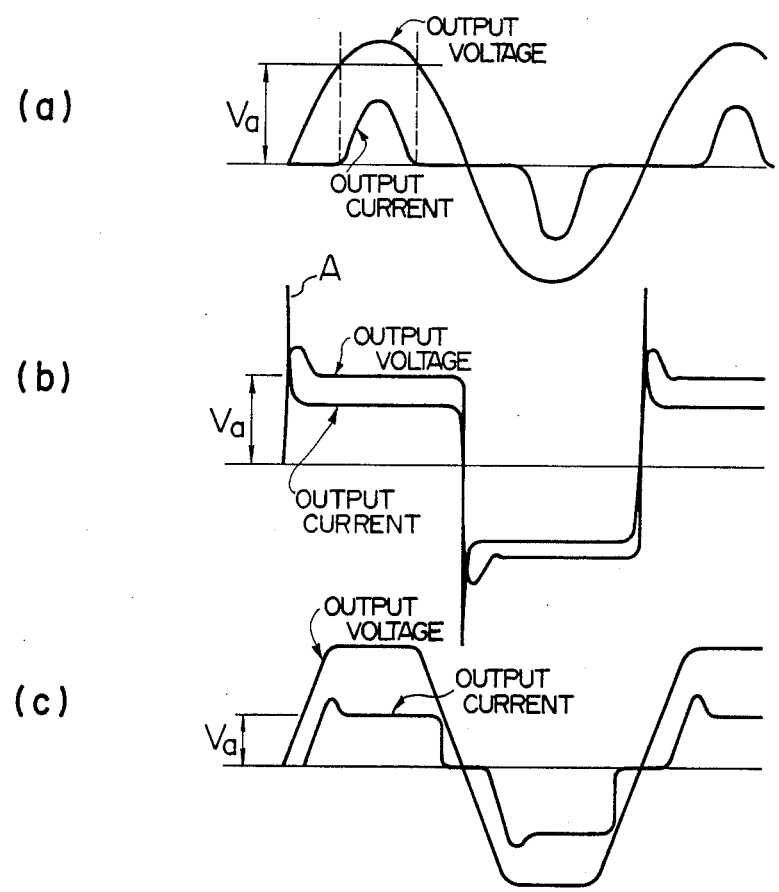
FIGS. 17a–c show waveform diagrams of voltages and currents in the AC corona generator.

FIG. 15 shows a further embodiment of the trapezoidal wave PWM pulse generator in which the stray capacitance of the secondary winding of the transformer 1 is used as an LC filter capacitor in the case where the transformer 1 is formed of a high-voltage transformer for use in electrography. In general, such a high-voltage transformer produces a high voltage across the secondary winding by increasing a voltage applied to the primary winding. Therefore, the number of turns of the secondary winding of the high-voltage transformer is made considerably larger than the number of turns of the primary winding. In this embodiment, the stray capacitance of the secondary winding of the large winding number is used as an LC filter capacitor. The stray capacitance obtained in the aforementioned embodiments shown in FIGS. 13 and 15 is not very high, but a sufficient filtering function can be obtained by the small stray capacitance because the switching frequency used in the present invention is a high frequency. The present invention in the case where the system is used as an electrographic AC power source apparatus will be described with reference to the drawings. FIG. 16 shows the voltage-current characteristic of an AC corona generator used as a load on the system, and FIG. 17 shows waveforms (a), (b) and (c) of voltages and currents in the case where respective output waveforms are applied to the AC corona generator. In general, the AC corona generator is used in a de-electrification/separation process as one of electrographic processes. To improve de-electrification of a light-sensitive material and separation of the light-sensitive material from a copy paper, it is necessary to improve de-electrification efficiency. Therefore, it is necessary to increase an effective corona discharge current. In FIG. 16, the points a and b represent plus and minus corona starting voltages +Vc and −Vc, respectively. No current flows while the voltage changes from the point 0 to each of the corona starting points a and b. In short, a current flows when the voltage exceeds the point a or b. However, a current may flow through the stray capacitance of the corona generator before the voltage exceeds the point a or b. In the case where the output voltage of the transformer 1 is a sine wave as shown in the diagram (a) of FIG. 17, the time duration in which the voltage in a half period of the waveform exceeds the corona starting voltage Va is short (or in other words the energizing angle is small). Accordingly, a large effective corona discharge current cannot be obtained, so that de-electrification efficiency cannot be improved. If the output voltage of the transformer 1 is increased to obtain a large effective corona discharge current, improvement of the insulation condition or enlargement of the size of the transformer 1 is required. In the case where the output voltage of the transformer 1 is a rectangular wave as shown in the diagram (b) in FIG. 17, a large effective discharge current can be obtained but a current flowing into the stray capacitance of the AC corona generator has a large peak value because the output voltage contains high-frequency components. The peak current A is a ineffective current not contributing to de-electrification efficiency. However, large-capacity switching elements are required. Accordingly, not only efficiency is deteriorated but also cost is increased. Further, the current A causes occurrence of noise because the current A flows like a spike. Accordingly, the noise may have a bad influence on other circuits and elements. Further, the rising/falling of the waveform is so rapid that an overshoot occurs in the output voltage. Because the overshoot causes an increase in the peak voltage, improvement of the insulation condition is required after all.

In such circumstances, the output voltage is made to be a trapezoidal wave as shown in the diagram (c) in FIG. 17. Further, by changing the rising/falling slope of the trapezoidal wave suitably, the output peak voltage (insulation condition), an effective current and occurrence of noise can be optimized respectively, to thus attain simplification of the corona generator and simplification of the power source apparatus in insulation and size. Accordingly, de-electrification efficiency can be maximized to improve de-electrifying characteristic and separating characteristic.

Figure 18:
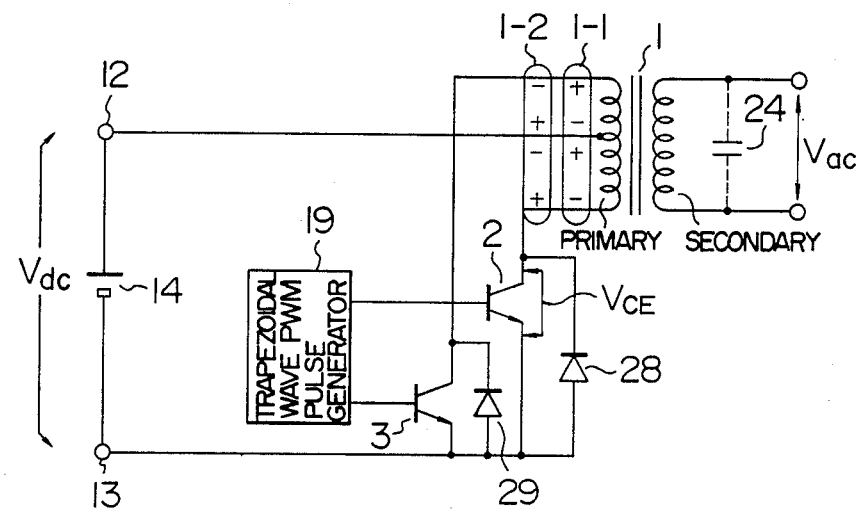

FIG. 18 shows the circuit configuration of another embodiment of the AC power source apparatus according to a second aspect of the present invention.

In FIG. 18, a DC power source 14 is connected across power supply terminals 12 and 13, one power supply terminal 12 being connected to an intermediate tap of a primary winding of a transformer 1. The primary winding of the transformer 1 is connected to the other power supply terminal 13 through the collector-emitter circuits of a pair of transistors 2 and 3 which serve as switching elements. Regenerative diodes 7 and 8 disposed in the reverse direction are connected between the collectors and the emitters of the transistors 2 and 3, respectively. A trapezoidal wave PWM pulse generator 19 generates a high-frequency pulse signal having a time ratio trapezoidally modulated with time. The pulse signal is fed to the respective bases of the transistors 2 and 3 so as to turn on the transistors alternately. A capacitor 24 is equivalently provided across the secondary winding of the transformer 1. Although the embodiment has shown the case where the transistors are used as switching elements, it is a matter of course that the invention is not limited to the specific embodiment and that the invention is applicable to the case where MOS field-effect transistors or the like are used as switching elements.

Figure 19:
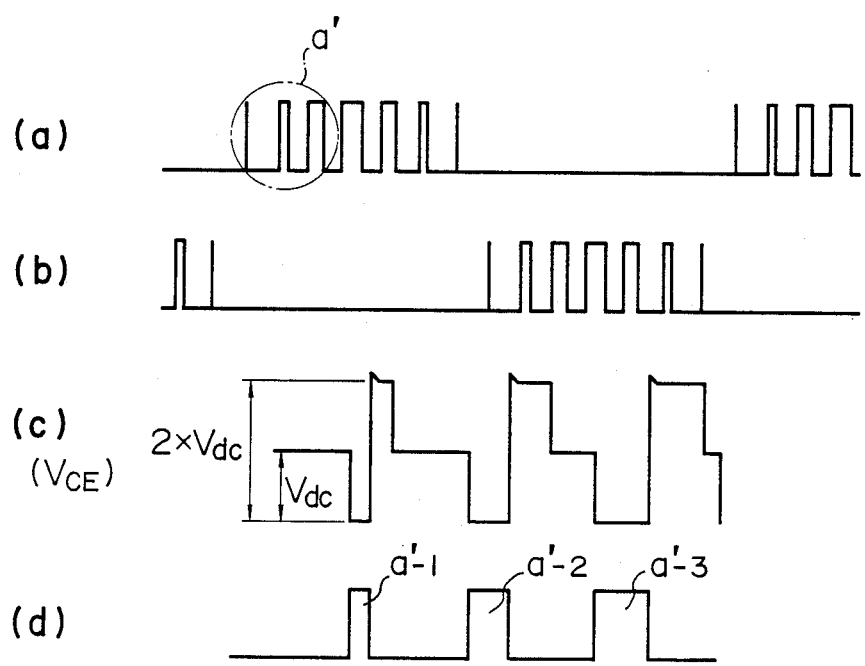
FIGS. 19a–d show waveform diagrams at various points depicted in FIG. 18.
Figure 21:
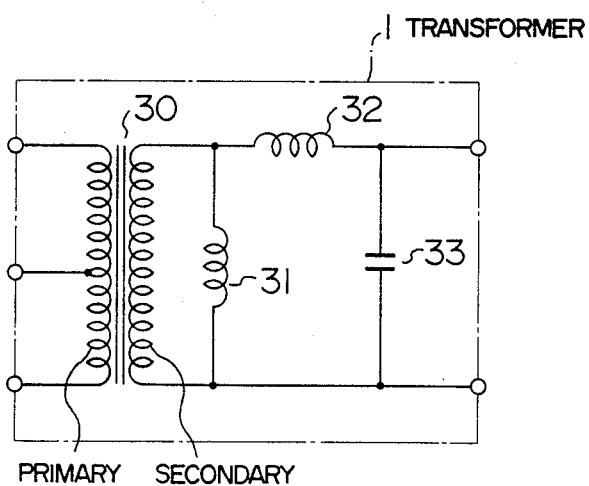
FIG. 21 is an equivalent circuit diagram of the transformer.

High-frequency pulse signals (a) and (b) as shown in FIG. 19 are obtained by the trapezoidal wave PWM pulse generator 19, As shown in FIG. 21, an equivalent circuit of the transformer 1 is composed of an ideal transformer 30, secondary-side inductance 31, secondary-side equivalent leakage inductance 32 (hereinafter referred to as "leakage inductance"), and stray capacitance 33. The high-frequency pulse signals are fed respectively to the bases of the respective transistors 2 and 3 to thereby turn on the transistors 2 and 3 alternately. High-frequency components are removed by an LC filter constituted by the leakage inductance 32 and the stray capacitance 33. As a result, a predetermined trapezoidal wave output voltage Vac as shown in the diagrams (b) to (e) in FIG. 11 can be produced in the secondary winding of the transformer 1.

The output voltage Vac can be changed suitably by changing the amplitude of the output of the trapezoidal wave generating circuit 20 in the trapezoidal wave PWM pulse generator 19 by using a control signal. Further, feedback control can be carried out by using an amplified signal obtained by making a comparison of the output voltage with a reference voltage, as a control signal.

Figure 20:
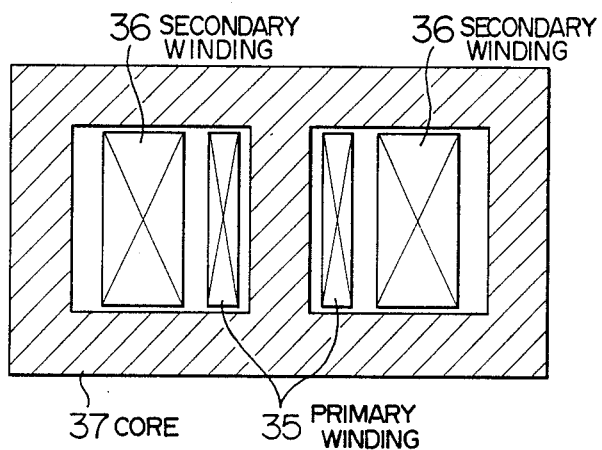
FIGS. 20, 22 and 23 are sectional views showing examples of widths and positions of windings of the transformer.
Figure 22:
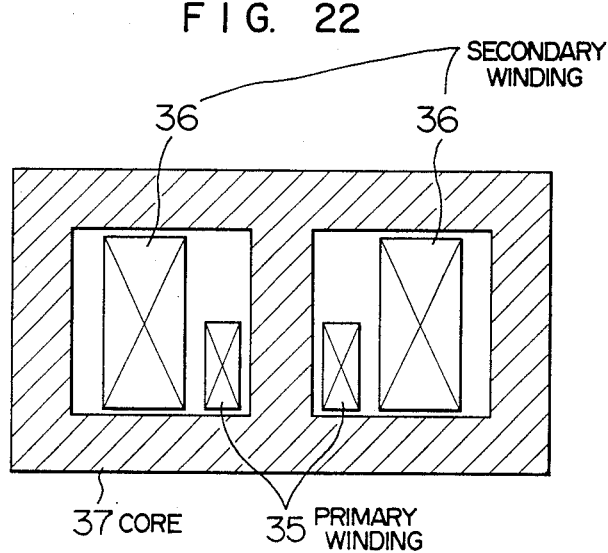
Figure 23:
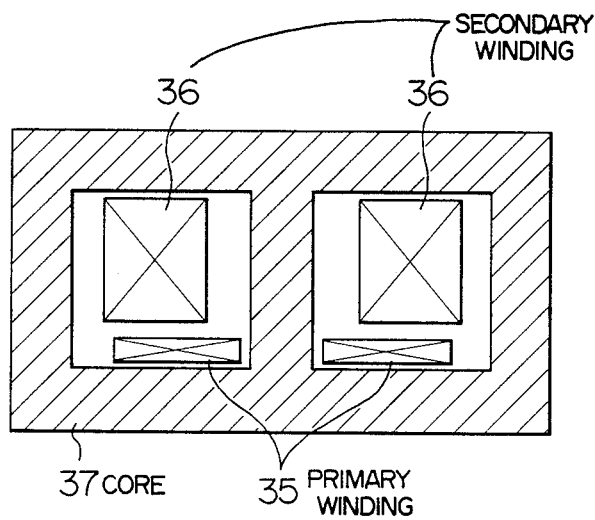

FIG. 19(d) is an enlarged view of a waveform depicted in FIG. 19(a). FIG. 19(c) shows a collector-emitter voltage (hereinafter abbreviated as "Vce") in the case where a waveform a' in FIG. 19(a) is applied to the base of the transistor. Under the condition that the coupling between the two portions of the primary winding of the transformer 1 is good so that the forward direction voltage drop of the regenerative diode 29 is 0V, it is now assumed that the transistors 2 and 3 are switched alternately at every half period of the output by the high-frequency pulse signals having a modulated time ratio. A description will be made of the ON/OFF operation of the transistor 2 performed in a half period in which the transistor 3 is OFF. When a pulse a'-1 in FIG. 19(d) is applied to the base of the transistor 2, the transistor 2 is turned on so that Vce becomes 0V. In this condition, a voltage having a polarity 1-1 is applied to the primary winding of the transformer 1. When the application of the pulse a'-1 to the base of the transistor 2 ends, the transistor 2 is turned off. In this condition, a voltage having a polarity 1-2 is produced in the primary winding of the transformer 1 by the Lenz's law. This voltage biases the collector-emitter voltage of the transistor 3 in a negative direction to cause a negative current to flow. However, the negative current is regeneratively fed back to the DC power source 14 through the regenerative diode 29 because the regenerative diode 29 is connected in the forward direction. Thus, the regenerative diode 29 acts to protect the transistor 3 from the reverse-direction voltage. At the same time, Vce of the transistor 2 is clipped within a range of 2×Vdc as shown in FIG. 19(c) because the regenerative diode 29 is ON. Thus, the regenerative diode 29 acts to prevent an excessive voltage from being applied between the collector-emitter circuit of the transistor 2. The same switching operation as described above is repeated as to the pulses a'-1, a'-2, a'-3, . . . Thus, the same switching operation of the transistor 3 is repeated in the next half period. Thus, an output voltage Vac can be obtained in the secondary winding of the transformer 1. The leakage inductance of the transformer 1 varies widely according to the winding widths, winding positions and winding methods of the primary and secondary windings of the transformer 1. In general, the transformer 1 is constructed as shown in FIG. 20 in which the primary winding 35 and the secondary winding 36 of the same width and at the same position are provided by a telescopic winding method to reduce leakage inductance relatively. In the case where the leakage inductance of the transformer 1 is used as inductance for forming an LC filter for removing high-frequency components of the wave modulated by a high-frequency wave, the leakage inductance is made to have a relatively large value to lower the frequency (switching frequency) of the high-frequency oscillating circuit. In short, high efficiency of the apparatus of the present invention can be obtained by making the leakage inductance assume a relatively large value. Therefore, the transformer 1 may be constructed as shown in FIG. 22 in which the primary winding 35 and the secondary winding 36 are different in winding width and winding position. Alternatively, the transformer 1 may be constructed as shown in FIG. 23 in which the primary winding 35 and the secondary winding 36 are provided separately. By using those winding methods, the coupling between the primary winding 35 and the secondary winding 36 is adjusted to optimize the value of leakage inductance with respect to the switching frequency to thereby make it possible to use the leakage inductance as inductance for forming an LS filter. It is, however, a matter of course that the leakage inductance of a transformer having relatively small leakage inductance as shown in FIG. 20 can be used effectively as inductance for forming an LC filter if the switching elements can be switched so speedily tat the switching frequency of the high-frequency pulse signal can be heightened sufficiently. In each of FIGS. 20, 22 and 23, the reference numeral 37 designates a core.

In the following, the trapezoidal wave generating circuit 20 to be used in the embodiments of the present invention is described in detail.

Figure 24:
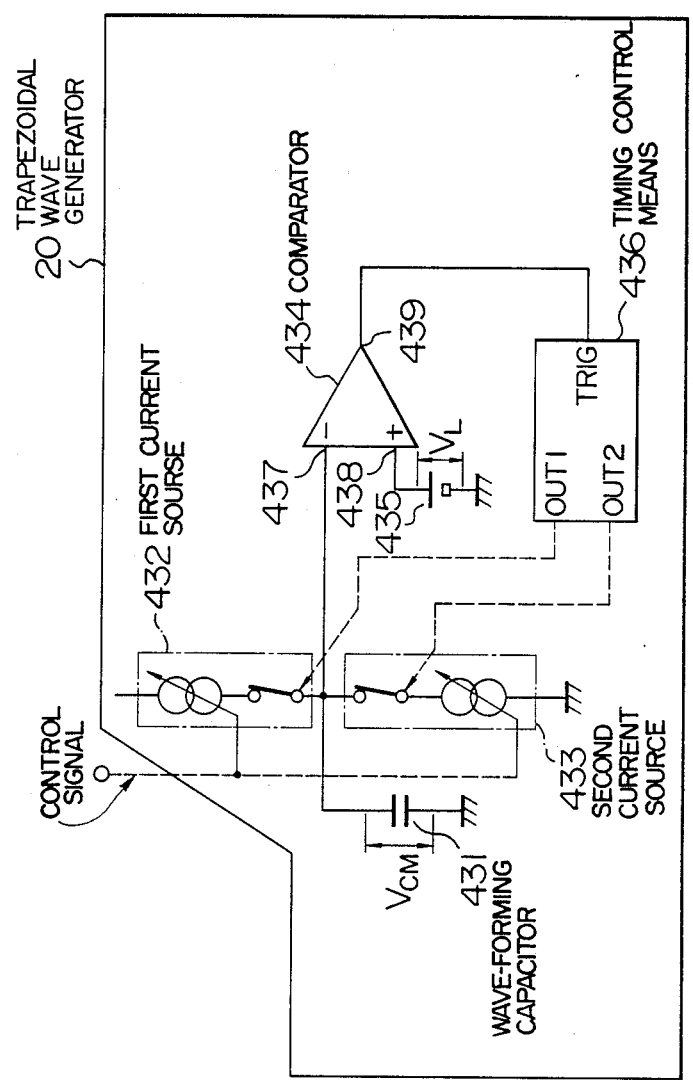
FIG. 24 is a diagram of a trapezoidal wave generating circuit 20.

FIG. 24 shows the construction of an amplitude-controlled trapezoidal wave generating circuit 20. The amplitude-controlled trapezoidal wave generating circuit 20 is described with reference to FIG. 25 which shows waveforms at various points of the circuit 20.

Figure 25:
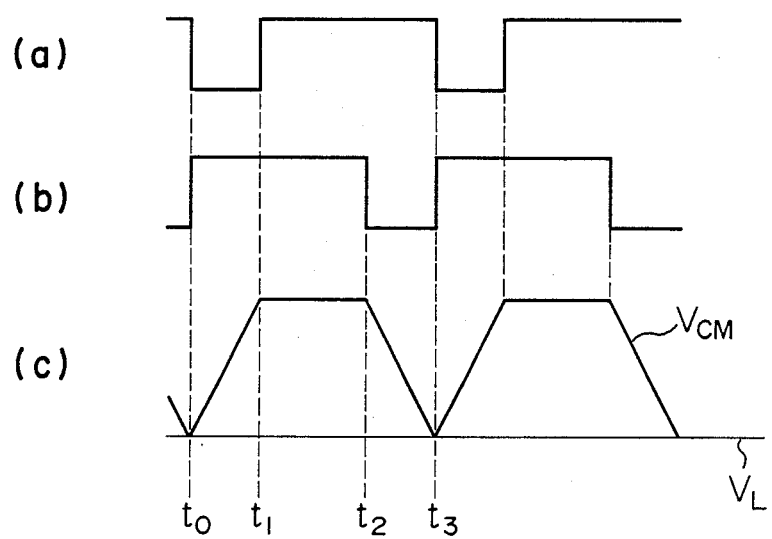
FIG. 25 shows waveforms for explaining the operation of the trapezoidal wave generator 20 depicted in FIG. 24.
Figure 26:
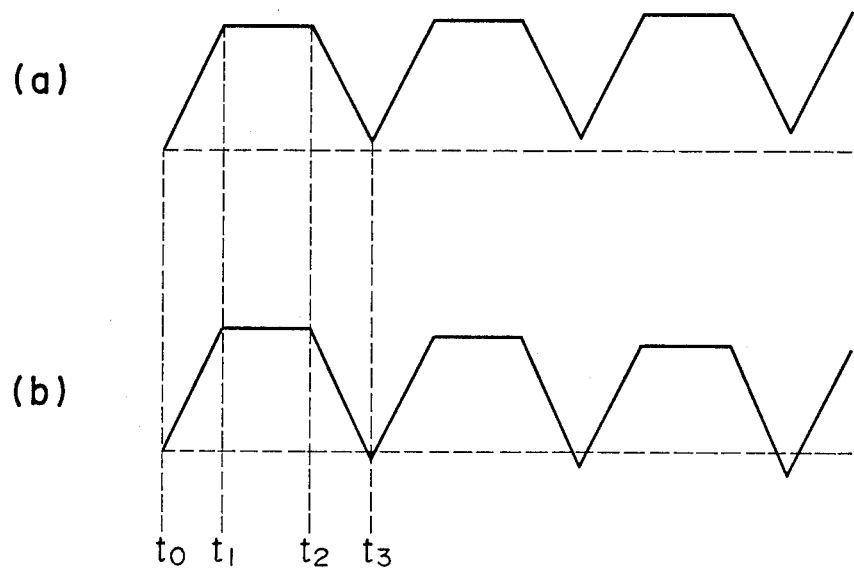
FIG. 26 shows waveforms in the condition in which the level of the trapezoidal wave rises.

In FIG. 24, the reference numeral 431 designates a wave-forming capacitor. The reference numeral 432 designates a first current source (hereinafter called "charge current source") connected in series with the wave-forming capacitor 431 so as to be turned on and off optionally and having a current value determined optionally. The reference numeral 433 designates a second current source (hereinafter referred to as "discharge current source") connected in parallel with the wave-forming capacitor 431 so as to be turned on and off optionally and having a current value determined optionally. The first current source 432 for charging and the second current source 433 for discharging the wave-forming capacitor 431 are constructed so that the current values thereof can be changed in interlinked relation with each other by a control signal. The reference numeral 434 designates a comparator which has one input terminal 438 connected to a reference voltage source 435 for setting discharge end timing, the other input terminal 437 connected to the wave-forming capacitor 431, and an output terminal 439, and by which a comparison output is obtained by making a comparison between the voltage ($V_L$) of the discharge end timing setting reference voltage source 435 and the voltage ($V_{CM}$) of the wave-forming capacitor. The reference numeral 436 designates a timing control means having a terminal TRIG connected to the output terminal 439 of the comparator 434, and terminals OUT1 and OUT2 for producing a first timing signal and a second timing signal to perform ON/OFF control of the first and second current sources 432 and 433, respectively. In the following, the circuit shown in the block diagram of FIG. 24 is described with reference to the waveform diagram of FIG. 25. FIG. 25(a) shows a waveform of OUT1 of the timing control means 436, FIG. 25(b) shows a waveform of OUT2 of the timing control means 436, and FIG. 25(c) shows a waveform of $V_{CM}$. The timing control means 436 triggered by the output of the comparator 434 at time $t_0$ produces the waveform of FIG. 25(a) at OUT1 by a timer for generating timing of $t_1$ and $t_2$. At time $t_0$, OUT1 is turned to assume an L level to thereby start the operation of the first (charge) current source 432, so that the wave-forming capacitor 431 is charged with a constant current. Accordingly, $V_{CM}$ increases linearly upward on the right hand as shown in FIG. 25(a). At first timing $t_1$, OUT1 is turned to assume an H level to terminate the operation of the first current source 432. After the time $t_1$, neither charging nor discharging is carried out, so that $V_{CM}$ is kept constant. Accordingly, $V_{CM}$ moves in a parallel direction in the drawing. Then, the waveform as shown in FIG. 25(b) is produced in OUT2. At second timing $t_2$, OUT2 is turned to assume an L level to start the operation of the first (discharge) current source 433, so that the wave-forming capacitor 431 is discharged with a constant current. Accordingly, $V_{CM}$ decreases linearly downward on the right hand as shown in FIG. 25(b). When $V_{CM}$ reaches the level of $V_L$ at time $t_3$, the timing control means 436 is triggered again by the output of the comparator 434 to turn OUT1 and OUT2 to assume an L level and an H level, respectively, to thereby terminate the operation of the second (discharge) current source 433 and reset the timer to $t_0$. The aforementioned procedure is repeated to produce a trapezoidal wave $V_{CM}$ continuously. By changing the current values of the first (charge) current source 432 and the second (discharge) current source 433 in interlinked relation with each other, the amplitude of the trapezoidal wave $V_{CM}$ having a similar shape can be changed. By changing the first timing $t_1$ of the timing control means 436, the rising/falling slope of the trapezoidal wave can be changed a shown by the characteristic curves a-1, a-2, a-3 and a-4 in FIG. 11a. In other words, the waveform can be changed continuously to a suitable one of rectangular wave, trapezoidal wave and triangular wave. Further, as described above, the trapezoidal wave generating means according to the present invention generates a trapezoidal wave composed of a rising portion (charge portion) limited by a duration $t_1$-$t_0$, a flat portion (non-charge non-discharge portion) limited by a duration $t_2-t_1$ and a falling portion (discharge portion) limited by the level of $V_L$. As compared with the case where the rising portion, the flat portion and the falling portion of the trapezoidal wave are all controlled by 5 timings, the difference between the current values of the first and second current sources 432 and 433 or the time difference between the durations $t_1-t_0$ and $t_3-t_2$ are accumulated as shown in FIGS. 26a and 26b. Accordingly, if the current values or the durations are even only slightly different, the trapezoidal wave is shifted to make it impossible to have a waveform kept in a stable level. However, in the former case (the present invention,, a waveform kept in a stable level can be obtained by a simple circuit construction. In the latter case, the level of the trapezoidal wave increases gradually when the trapezoidal wave as shown in FIG. 26a is used as a pulse-width-modulated wave in the power source apparatus as shown in FIGS. 5 and 18. As a result, the increased level of the trapezoidal wave output completely exceeds the high-frequency wave output (see FIG. 8a) which serves as a comparative waveform for pulse width modulation. As a result, the pulse time ratio always increases to 100% or to a maximum time ratio in the case where a circuit for limiting the time ratio to the maximum time ratio is provided. Accordingly, the pulse wave is shaped rectangularly, so that the transformer 1 having flux density set for a trapezoidal wave is saturated. Consequently, excessive currents flow in the transistors 2 and 3, so that the transistors 2 and 3 may be broken. When the trapezoidal wave voltage increases more up to the source voltage of the trapezoidal wave generating circuit, the trapezoidal wave is changed to a DC level. Although the distribution circuit 23 as shown in FIG. 7 is triggered by the output 439 of the comparator 434 as shown in FIG. 24 at time $t_0$, the trigger is not performed when the trapezoidal wave is in the DC level. Accordingly, the distribution circuit 41 cannot operate, so that one of the push-pull transistors 2 and 3 conducts continuously and, consequently, it is broken instantaneously. On the other hand, when the trapezoidal wave as shown in FIG. 26b is used as a pulse-width-modulated wave in the power source apparatus as shown in FIGS. 5 and 18, the level of the trapezoidal wave is so lowered that the level of the trapezoidal wave voltage is always lower than the level of the high-frequency wave output (see FIG. 8a) which acts as a comparative waveform for pulse width modulation. There arises a problem in that the pulse time ratio decreases to 0% to stop the output.

Figure 27:
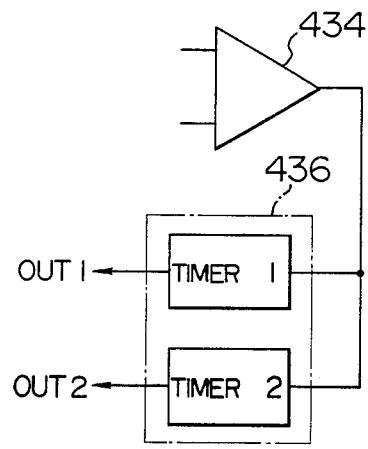
FIGS. 27 and 28 are block diagrams showing examples of the timing control means.

FIG. 27 shows an example of the timing control means 436 in which a first timer and a second timer are arranged in parallel with each other. The timers are triggered by the output of the comparator 434 to start their operations, so that first timing is obtained by the first timer and second timing is obtained by the second timer. As a result, a waveform as shown in FIG. 25a is obtained at OUT1 and a waveform as shown in FIG. 25b is obtained at OUT2.

Figure 28:
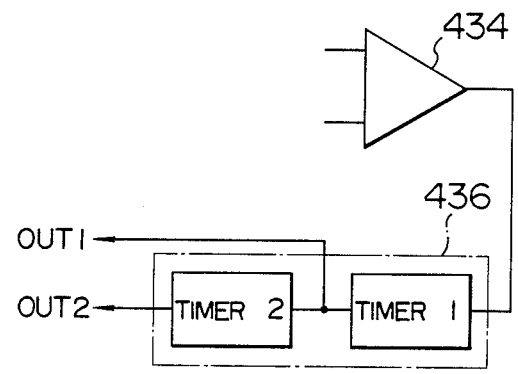

FIG. 28 shows another example of the timing control means 436 in which a first timer and a second timer are arranged in series with each other. The first timer is triggered by the output of the comparator 434 to obtain first timing. The second timer is triggered by the first timing to obtain second timing. As a result, a waveform as shown in FIG. 25a is obtained at OUT1 and a waveform as shown in FIG. 25b is obtained at OUT2.

Figure 29:
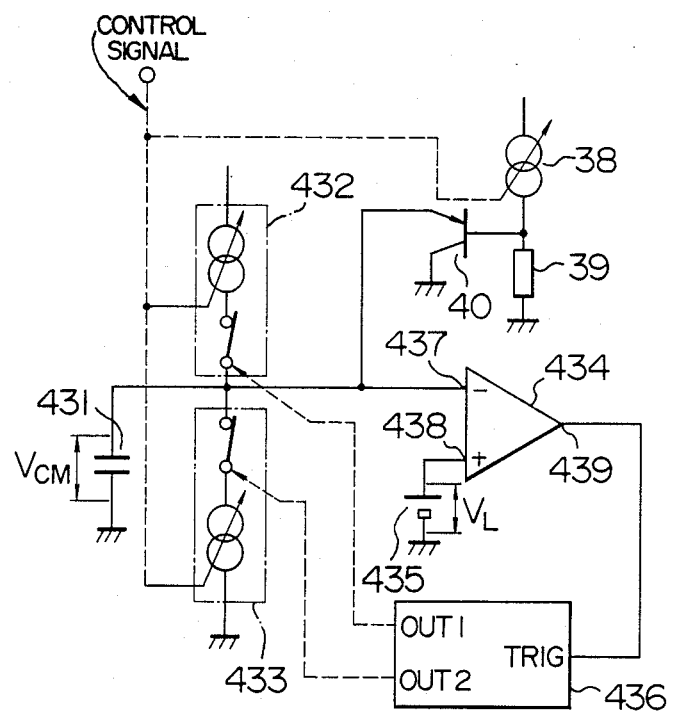
FIG. 29 is a circuit diagram showing the case where a third power source is added to the circuit diagram depicted in FIG. 24.
Figure 30:
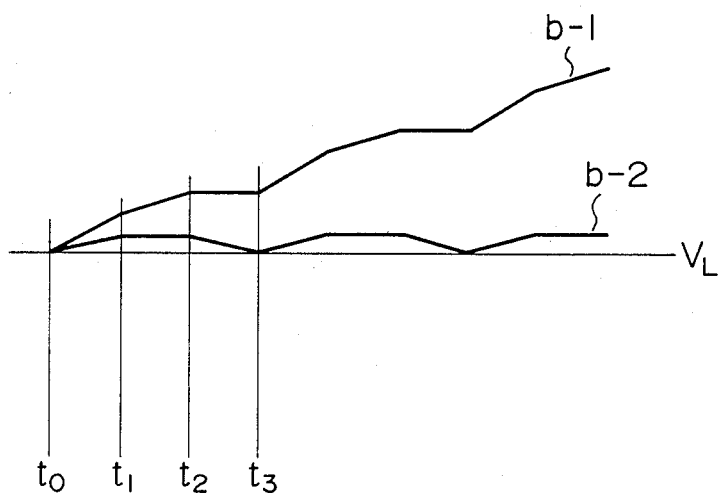
FIG. 30 is a waveform diagram showing the voltage $V_{CM}$.

FIG. 29 shows another embodiment of the trapezoidal wave generating circuit in which there are further provided; a third current source 38 synchronously operated with the first and second (charge and discharge) current sources 432 and 433; an impedance element 39 connected to the third current source 38 so as to conduct the current of the current source 38 thereby to generate a voltage drop; and a transistor 40 connected to the wave-forming capacitor 431 and operated by the voltage drop produced by the impedance element 39. When the current values of the first and second current sources 432 and 433 are reduced to a predetermined value or less, the voltage $V_{CM}$ is discharged to limit the amplitude of the trapezoidal wave to thereby prevent an operation error of the circuit in the case where the control signal is a small signal. In the following, the operation of the circuit is described with reference to FIG. 30 in which a voltage waveform of $V_{CM}$ is shown. When the control signal becomes small and when the current values of the charge and discharge current sources 432 and 433 become small with the reduction of the control signal, the amplitude of $V_{CM}$ is reduced as shown by the characteristic curve b-2 in FIG. 30. When the current values of the charge and discharge current sources 432 and 433 become small, an input bias current existing in the input terminal 437 of the comparator 434 is relatively increased to be non-negligible. In short, the input bias current exerts an influence as follows. When the input bias current flows into the wave-forming capacitor 431 $V_{CM}$ increases upward to the right as shown by the characteristic curve b-1 in FIG. 30, because the discharging capability is canceled. In the case where the waveform as shown by the characteristic curve b-1 in FIG. 30 is used as a pulse-width-modulated waveform in the power source apparatus as shown in FIGS. 5 and 12, a problem arises as follows. When, for example, the output is to be reduced, that is to say, when the control signal is reduced to a small value, the level of the trapezoidal wave increases gradually. As a result, the increased level of the trapezoidal wave output perfectly exceeds the high-frequency wave output (see FIG. 8a) which acts as a comparative waveform for pulse width modulation. As a result, the pulse time ratio always increases to 100% or to a maximum time ratio in the case where a circuit for limiting the time ratio to the maximum time ratio is provided. As a result, the output cannot be controlled. At the same time, the pulse wave is shaped rectangularly, so that the transformer 1 having flux density set for a trapezoidal wave is saturated. Consequently, excessive currents flow in the transistors 2 and 3, so that the transistors 2 and 3 may be broken. When the trapezoidal wave voltage increases more up to the source voltage of the trapezoidal wave generating circuit, the trapezoidal wave is changed to a DC level. Although the distribution circuit 23 as shown in FIG. 7 is triggered by the output 439 of the comparator 434 as shown in FIG. 24 at time $t_0$, the trigger is not performed when the trapezoidal wave is in the DC level. Accordingly, the distribution circuit 23 cannot operate, so that one of the push-pull transistors 2 and 3 conducts continuously and, consequently, is broken instantaneously. To solve this problem, the circuit as shown in FIG. 30 is constructed so that the ratio of the third current source 38 to the first and second current sources 432 and 433 and the impedance of the impedance element 39 can be set to perform the aforementioned amplitude control under the condition that the current values of the current sources 432 and 433 are not less than the current value of the input bias current. Accordingly, the operation error of the circuit can be prevented.

Figure 31:
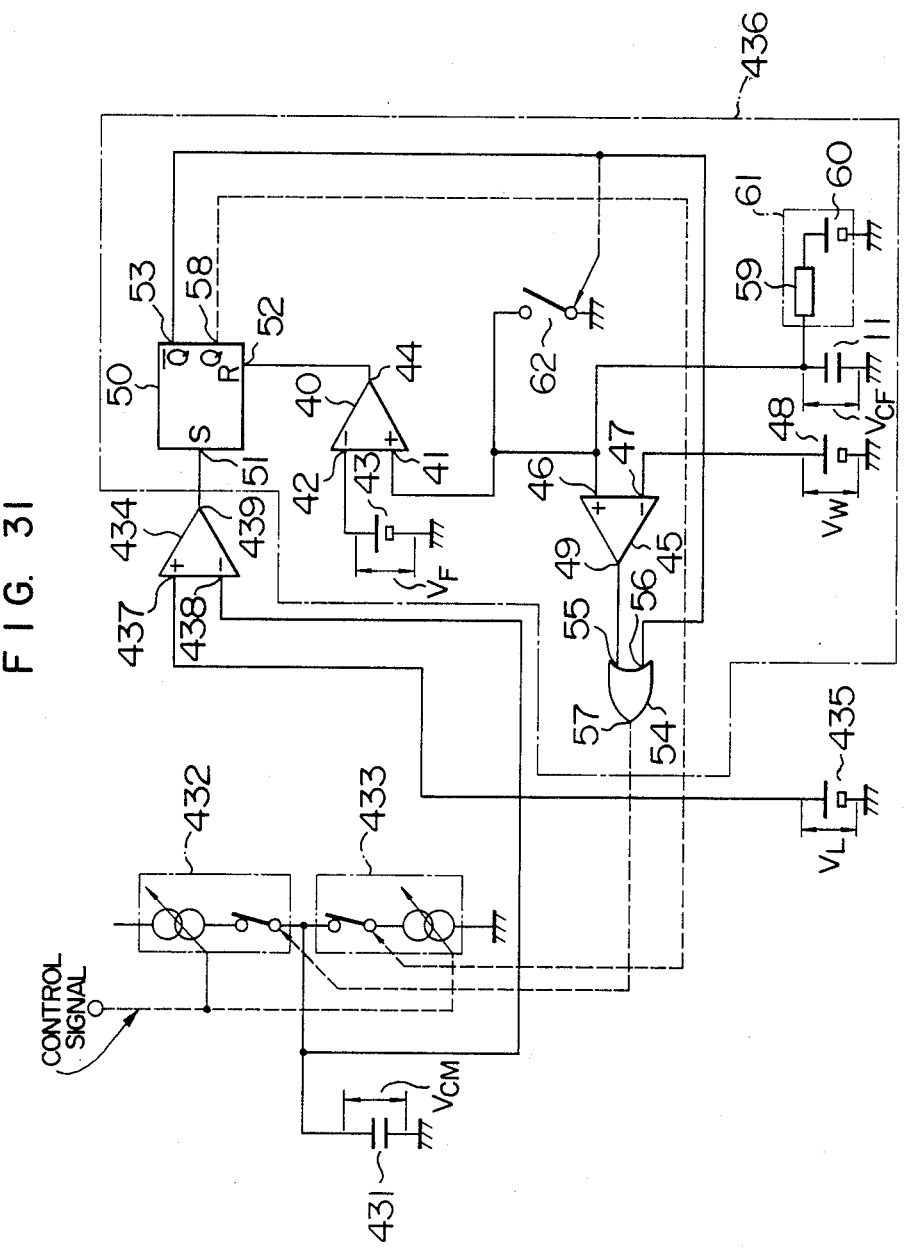
FIG. 31 is a detailed diagram of the amplitude-limited trapezoidal generating circuit.

FIG. 31 shows a detailed circuit construction of the amplitude-controlled trapezoidal wave generating circuit 20. In each of FIGS. 31 and 29, like numerals refer to like parts.

In FIG. 31, the reference numeral 40 designates a second comparator having one input terminal 41 connected to the timing control capacitor 11, another input terminal 42 connected to a reference voltage source 43 for setting discharge start timing (second timing $t_2$), and an output terminal 44 for sending out a comparative output obtained by the comparator 40.

The reference numeral 45 designates a first comparator having one terminal 46 connected to the timing control capacitor 11, another input terminal 47 connected to a reference voltage source 48 for setting charge end timing (first timing $t_1$), and an output terminal 49 for sending out a comparative output obtained by the comparator 45. The reference numeral 50 designates an RS flip-flop (bistable trigger circuit) having two input terminals 51 and 52 and two output terminals 53 and 58. The output terminal 439 of the comparator 434 is connected to the input terminal 51 of the flip-flop 50. The output terminal 44 of the comparator 40 is connected to the other input terminal 52 of the flip-flop 50. The output terminal 53 of the flip-flop 50 is connected to the output terminal 49 of the first comparator 45 and to two input terminals 55 and 56 of an OR circuit 54. The ON/OFF control of the first (charge) current source 432 is carried out by a signal from the output terminal 57 of the OR circuit 54. The other output terminal 58 of the RS flip-flop 50 is provided to carry out the ON/OFF control of the second (discharge) current source 433. The timing control capacitor 11 is charged by a charge means 61, which is constituted by a resistor 59 and a voltage source 60, and is discharged rapidly by a reset means which is constituted by a switching element 62. In short, the timing control capacitor 11 is provided with a charge/discharge circuit having a charge means and a reset means. The ON/OFF control of the switching element 62 is carried out by a signal from the output terminal 53 of the RS flip-flop 50.

In the following, the operation of the circuit constructed as described above is described with reference to FIGS. 32a to 32h in which waveforms are shown.

Figure 32:
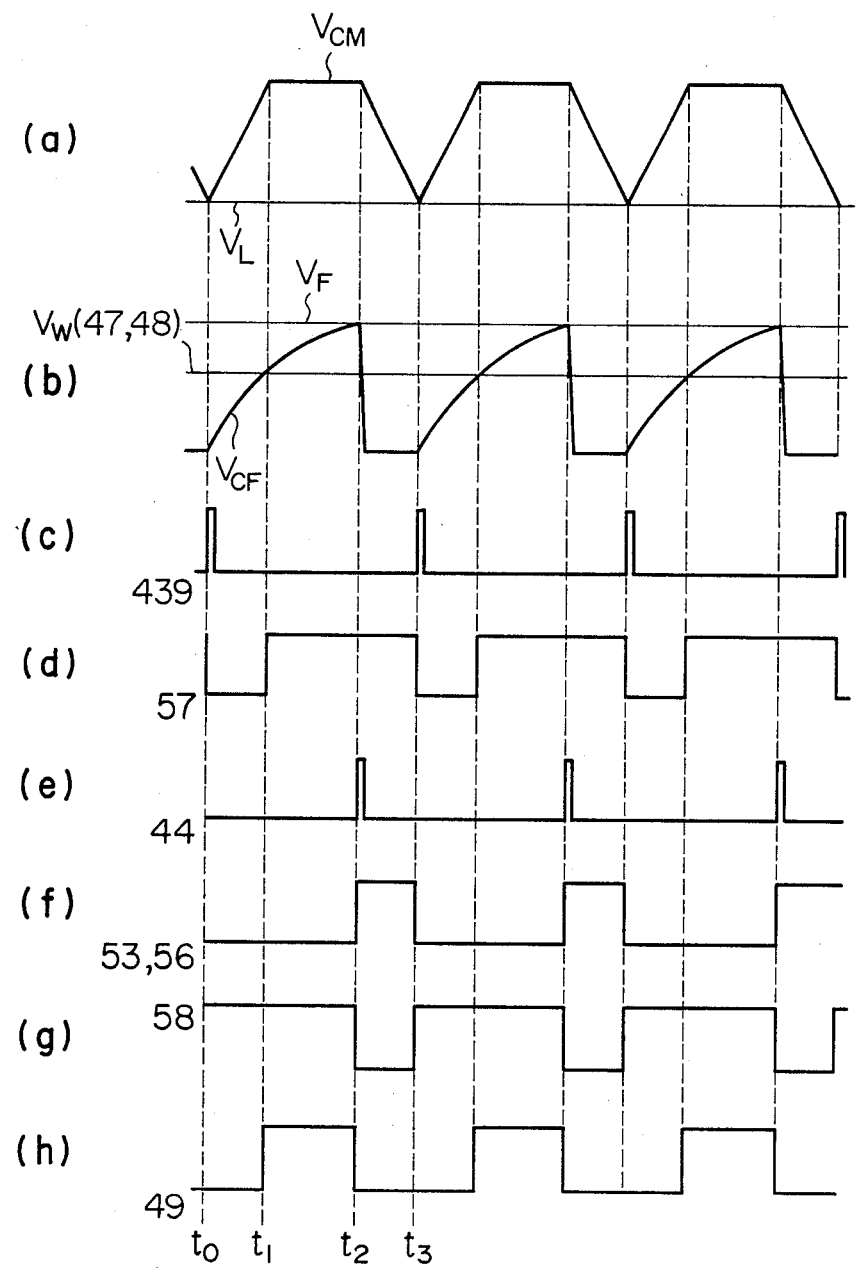
FIG. 32 shows waveforms at various points depicted in FIG. 31.

Before time $t_0$, the comparator 434 has the input condition that the level of the input terminal 437 is less than the level of the input terminal 438. Accordingly, the output terminal 439 of the comparator 434 is in an L level. At time $t_0$, the voltage $V_{CM}$ is reduced so that the input condition of the comparator 434 is changed to the condition that the level of the input terminal 437 is higher than the level of the input terminal 438. Accordingly, the output terminal 439 is turned to assume an H level as shown in FIG. 32c, so that the input terminal 51 of the RS flip-flop 50 is set by the signal from the output terminal 439. As a result, the output terminal 53 of the RS flip-flop 50 is turned to assume an L level as shown in FIG. 32f, so that the switching element 62 is turned to be in an OFF state. As a result, a current is fed to the timing control capacitor 11 by the charge means 61, so that the voltage ($V_{CF}$) produced in the timing control capacitor 11 increases exponentially upward to the right as shown in FIG. 32b. On the other hand, at time $t_0$, the output terminal 58 of the RS flip-flop 50 is turned to assume an H level as shown in FIG. 32g, so that the second (discharge) current source 433 is turned to be in an OFF state. Because the comparator 45 has the input condition that the level of the input terminal 46 is less than the level of the input terminal 47, the output terminal 49 of the comparator 45 is at an L level as shown in FIG. 32h. Because the output terminal 53 of the RS flip-flop 50 is also at an L level, the levels of the two input terminals 55 and 56 of the OR circuit 54 are low. Accordingly, the output terminal 57 of the OR circuit 54 is turned to assume an L level a shown in FIG. 32d, so that the first (charge) current source 432 is turned to be in an ON state. As a result, a current is fed to the wave-forming capacitor 431, so that $V_{CM}$ increases linearly upward to the right as shown in FIG. 32a. When the voltage $V_{CF}$ increases more to reach the reference value ($V_W$) of the charge end timing setting reference voltage source 48 at time $t_1$ as shown in FIG. 32b, the input condition of the comparator 45 is changed to the condition that the level of the input terminal 46 is higher than the level of the input terminal 47. Accordingly, the output terminal 49 is turned to assume an H level as shown in FIG. 32h. Further, the output terminal 57 of the OR circuit 54 is turned to assume an H level as shown in FIG. 32d. As a result, the first (charge) current source 432 is turned to be in a OFF state to stop current supply for the wave-forming capacitor 431. At this time, the state of the RS flip-flop is not changed, so that the voltage $V_{CM}$ is kept constant as shown in FIG. 32a, or, in other words, the voltage $V_{CM}$ moves in a parallel direction in the drawing.

When the voltage $V_{CF}$ increases more to reach the reference value ($V_F$) of the discharge start timing setting reference voltage source 43 at time $t_2$ as shown in FIG. 32b, the input condition of the comparator 40 is changed to the condition that the level of the input terminal 42 is less than the level of the input terminal 41. Accordingly, the output terminal 44 is turned to assume an H level as shown in FIG. 32e, so that the input terminal 52 of the RS flip-flop 50 is reset. As a result, the RS flip-flop 50 is inverted so that the output terminal 53 is turned to assume an H level as shown in FIG. 32f. As a result, the switching element 62 is turned to be in an ON state, so that the voltage $V_{CF}$ is discharged rapidly as shown in FIG. 32b, thus to reset the timing control capacitor 11. On the other hand, at time $t_2$, the output terminal 58 of the RS flip-flop 50 is turned to assume an L level as shown in FIG. 32g, so that the second (discharge) current source 433 is turned to be in an ON state. As a result, the voltage $V_{CM}$ is discharged to be reduced linearly downward to the right as shown in FIG. 32a. When $V_{CM}$ is reduced to the level $V_L$ or less at time $t_3$ by discharging, the comparator 434 sets the RS flip-flop 50 again to terminate the operation of the second (discharge) current source 433. Consequently, the aforementioned operation is repeated, thereby to produce a trapezoidal wave of $V_{CM}$ continuously.

In the embodiments as shown in FIGS. 27 and 28, the timing control means has two timers. It is, therefore, necessary to set time coefficients for the timers, respectively. There arises a disadvantage in that not only parts increase in number but also IC pins increase in number in the case where the circuit of the present invention is provided in the form of an IC. As a result, both the chip area of the IC and the number of external parts connected to the IC increase to cause an increase in cost. For the purpose of changing the frequency of the trapezoidal wave with the waveform kept constant, it is necessary to change the time coefficients of the two timers concurrently while keeping the relative ratio thereof suitable. However, it is very difficult to control the two time coefficients. According to the construction as shown in FIG. 31, timing control can be carried out by a single time coefficient. Accordingly, not only parts can be reduced in number but also IC pins can be reduced in number in the case where the circuit is provided in the form of an IC. As a result, cost can be reduced. Further, the purpose of changing the frequency of the trapezoidal wave with the waveform kept constant can be attained by making the single time coefficient variable (by providing the resistor of the charge means 61 in the form of a variable resistor).

Figure 33:
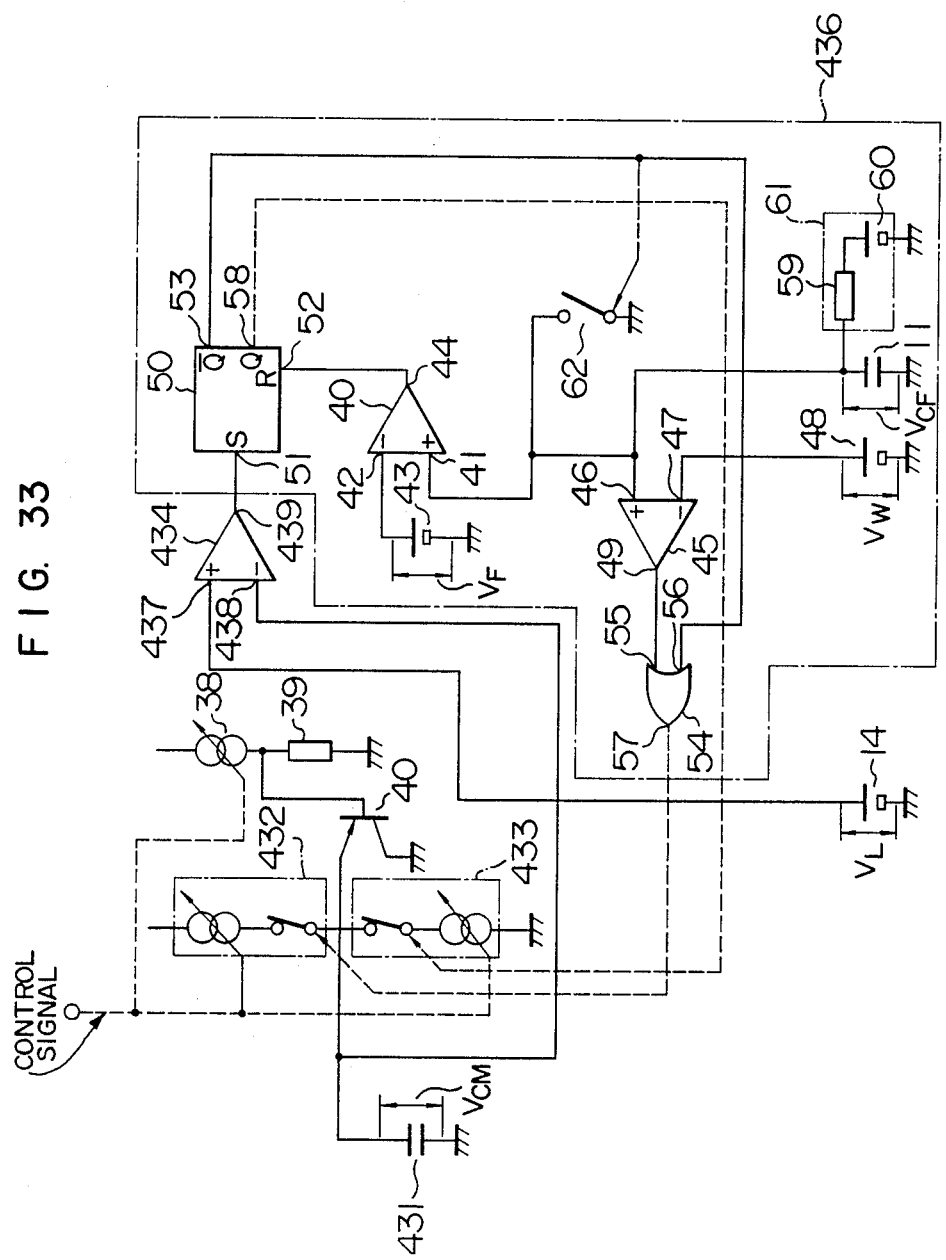
FIG. 33 is a diagram showing another embodiment of the amplitude-limited trapezoidal wave generating circuit.

FIG. 33 shows an example of the construction of the amplitude-controlled trapezoidal wave generating circuit which is formed by adding the timing control circuit 436 of FIG. 31 to the amplitude limiting means of FIG. 29.

FIGS. 34 and 35 show examples of the partial construction of the timing control circuit of FIG. 31, that is, show the charge means 61, the timing control capacitor 11 and the switching element 62. Waveforms in the operation of the circuit as shown in FIGS. 34 and 35 are shown in FIGS. 36 and 37, respectively.

In FIG. 34 the reference numeral 62 designates means for resetting the timing control capacitor 11. The means 62 is constituted by a switching element 62 and a power source 211. In FIG. 34, the reference numeral 63 designates a discharge means provided corresponding to the charge means 61 as shown in FIG. 31 and constituted by a resistor.

When the switching element 62 is ON, a voltage is applied to the timing control capacitor 11 so that $V_{CF}$ increases rapidly as shown in FIG. 36. Then, when the switching element 62 is turned off, the timing control capacitor 11 is discharged by the discharge means (resistor) 63 so that $V_{CF}$ increases exponentially to obtain a right downward waveform as shown in FIG. 36. By carrying out the ON/OFF control of the switching element 62 by the signal from the RS flip-flop 50, a continuous timing control waveform as shown in FIG. 36 can be obtained.

In FIG. 35, the reference numeral 61 designates a charge means provided instead of the charge means 61 of FIG. 31 and constituted by a current source 153. The current source 153 is connected in series with the timing control capacitor 11. The switching element 62 is connected in parallel with the timing control capacitor 11. When the switching element 62 is OFF, a current is fed to the timing control capacitor 11, so that $V_{CF}$ increases linearly to obtain a right upward waveform as shown in FIG. 37. Then, when the switching element 62 is turned on, $V_{CF}$ is short-circuited to be discharged rapidly as shown in FIG. 37. By carrying out the ON/OFF control of the switching element 62 by the signal from the RS flip-flop 50, a continuous timing control waveform as shown in FIG. 37 can be obtained. By making a comparison of the timing control waveform as shown in FIGS. 36 and 37 with the levels of $V_L$ and $V_W$, first timing and second timing can be obtained in the same manner as described above with reference to FIG. 31.

Various waveforms of the output voltage $V_{AC}$ as shown in Figs. 11b to 11e can be obtained by applying a high-frequency wave pulse signal pulse-width-modulated by $V_{CM}$ to the transistors 2 and 3 as shown in FIG. 5. The amplitude of the output wave can be changed while the shape of the output wave is kept similar. In short, the waveform is not changed by the change of the amplitude of the output wave.

As described above, according to the present invention, the following excellent effects can be attained.

(1) The AC power source apparatus according to the present invention does not require any resonance circuit. Accordingly, a loss due to a resonance current and DC resistance of the inductance is reduced. Because the resonance capacitor is replaced by a small-capacity filter capacitor, a dielectric loss is considerably reduced. Accordingly, high efficiency can be attained. Further, adjustment of the core gap of the transformer and adjustment of the resonance capacitor are not required for obtaining a predetermined output waveform stably. Accordingly, not only the apparatus is superior in producibility, but also the apparatus is free from the changes of $\mu$ of the core of the transformer and the equivalent gap thereof due to a change of temperature and the change of the output waveform and amplitude due to dispersion. Furthermore, the apparatus does not require any core gap of the transformer. Consequently, higher efficiency can be attained.

(2) The ouput frequency can be changed easily by adjusting the trapezoidal wave output period.

(3) The waveform shape and peak factor of the output are not affected by the input change, the load change and the output amplitude. Accordingly, a stable output waveform can be obtained.

(4) Because no resonance current flows in the windings of the transformer, the diameter of copper wires used for the windings of the transformer can be reduced. Accordingly, not only the size of the transformer can be reduced, but also switching elements having a small capacity can be used. Consequently, high efficiency and low cost can be attained.

(5) Because the switching operation can be carried out by a high frequency, not only the leakage inductance of the transformer can be used as L (inductance element) which is a constituent element of an LC filter but also the stray capacitance of the transformer can be used as C which is another constituent element of the LC filter. Accordingly, the reduction of size of the apparatus and the reduction of cost can be attained.

(6) With respect to the output waveform from the AC power source apparatus according to the present invention, any desired one of rectangular wave, trapezoidal wave, pseudo-sine wave, triangular wave and the like, having a desired rising/falling slope can be obtained by adjusting the rising/falling slope of the modulated trapezoidal wave. The desired output waveform can be produced efficiently by a simple circuit construction which is small in size and low in cost.

(7) In the case where the apparatus according to the present invention is used as an electrographic AC power source apparatus, the rising/falling slope of the trapezoidal wave can be set to be optimized for insulating relation and de-electrifying efficiency of the corona generator and the power source, and, at the same time, peak currents of the switching elements can be reduced. Accordingly, not only a small-scaled and high-efficient apparatus can be obtained but also de-electrifying efficiency can be increased to the maximum without an increase of the output peak voltage. Consequently, the improvement of de-electrifying/separating characteristic, the reduction of size of the corona generator and the AC power source apparatus, and the reduction of noise can be attained.

(8) The regenerative diode also serves as an element for preventing a reverse-direction voltage from being applied to the switching elements. In particular, in the case where MOS field-effect transistors are used as switching elements, the regenerative diode can be replaced by a parasitic diode, so that the power source apparatus can be constructed substantially without any used of regenerative and reverse-direction voltage prevention diodes.

(9) Because the output frequency can be changed easily by adjusting the period of the trapezoidal wave generating circuit and the trapezoidal wave generating circuit has only a single time coefficient, the change of the frequency can be carried out while the waveform shape is kept constant and, at the same time, the change of the frequency can be carried out easily by using one resistor which serves as a charge/discharge means.

(10) With respect to the waveform obtained by the amplitude-controlled trapezoidal wave generating circuit, the amplitude of the trapezoidal wave can be changed while the time ratio of the rising/falling duration and the flat portion is kept constant to have a similar shape. Accordingly, the waveform and peak factor do not vary due to the input change, the load change and the output amplitude. Consequently, a stable output waveform can be obtained.

We claim:

1. A non-resonance type AC power source apparatus comprising:
   a DC power source;
   a transformer having primary and secondary windings, said primary winding being provided with an intermediate tap;
   first and second switching element connected in inverse-series across said primary winding of said transformer;
   an inductance element having a series connection of a reset winding and a regenerative diode; said DC power source and said inductance element being connected in series between said intermediate tap of said primary winding and a junction of said first and second switching elements;
   a filtering capacitor connected in parallel with a selected one of said primary and secondary windings of said transformer; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by causing a capacitor to be charged and discharged, respectively, through two current sources connected respectively in series and in parallel with said capacitor and capable of being selectively turned on and off.

2. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   an inductance element having a series connection of a reset winding and a regenerative diode; said DC power source and said inductance element being connected in series between said intermediate tap of said primary winding and a junction of said first and second switching elements;
   a filtering capacitor connected in parallel with a selected one of said primary and secondary windings of said transformer; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by an amplitude-controlled trapezoidal wave generating circuit,
   said amplitude-controlled trapezoidal wave generating circuit including first and second current sources connected in series and in parallel with a wave-forming capacitor, respectively, and capable of being selectively turned on and off, with current values thereof being variable in interlinked relation with each other, a voltage detection means for detecting a voltage of said wave-forming capacitor, and a timing control means triggerable by an output of said voltage detection means for generating first and second timing signals, whereby the end timing of the operation of said first current source and the start timing of the operation of said first current source and the timing of the operation of said second current source are controlled by said timing control means, and the end timing of the operation of said second current source is controlled by a voltage level of said wave-forming capacitor.

3. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   an inductance element having a series connection of a reset winding and a regenerative diode; said DC power source and said inductance element being connected in series between said intermediate tap of said primary winding and a junction of said first and second switching elements;
   a filtering capacitor connected in parallel with a selected one of said primary of secondary windings of said transformer; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by an amplitude-controlled trapezoidal wave generating circuit,
   said amplitude-controlled trapezoidal wave generating circuit including first and second current sources connected in series and in parallel with a wave-forming capacitor, respectively, and capable of being selectively turned on and off, with current values thereof being variable in interlinked relation with each other, a voltage detection means for detecting a voltage of said wave-forming capacitor, and a timing control means triggerable by an output of said voltage detection means for generating first and second timing signals, whereby the end timing of the operation of said first current source and the start timing of the operation of said second current source are controlled by said timing control means, and the end timing of the operation of said current source is controlled by a voltage level of said wave-forming capacitor, wherein said timing control means includes: a charge/discharge means; a timing control capacitor; first and second voltage detection means for detecting a first timing and a second timing, respectively, by a voltage level of said timing control capacitor; said voltage detection means for detecting the voltage of said wave-forming capacitor; a latch means triggered by said second voltage detection means; and a reset means for resetting said timing control capacitor, whereby one of a logical product and a logical sum of the respective outputs of said latch means and said first voltage detection means is used as said first timing signal and the output of said latch means is used as said second timing signal.

4. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   an inductance element having a series connection of a reset winding and a regenerative diode; said DC power source and said inductance element being connected in series between said intermediate tap of said primary winding and a junction of said first and second switching elements;
   a filtering capacitor connected in parallel with a selected one of said primary and secondary windings of said transformer; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by an amplitude-controlled trapezoidal wave generating circuit,
   said amplitude-controlled trapezoidal wave generating circuit including first and second current sources connected in series and in parallel with a wave-forming capacitor, respectively, and capable of being selectively turned on and off, with current values thereof being variable in interlinked relation with each other, and a third current source whose current value is variable in interlinked relation with the respective current values of said first and second current sources, whereby the amplitude of said trapezoidal wave produced on said wave-forming capacitor by charging and discharging said wave-forming capacitor by said first and second current sources is limited by a voltage drop generated by a current value of said third current source and a impedance element.

5. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   an inductance element having a series connection of a reset winding and a regenerative diode; said DC power source and said inductance element being connected in series between said intermediate tap of said primary winding and a junction of said first and second switching elements;
   a filtering capacitor connected in parallel with a selected one of said primary and secondary windings of said transformer; and
   means for applying a time-ratio-modulated high frequency pulse to said first and second switching elements alternately at every half period of a output period of said transformer, said output period being set to be longer than a period of said high frequency pulse,
   said high frequency pulse being time-ratio-modulated by a trapezoidal wave obtained by an amplitude-controlled trapezoidal wave generating circuit,
   said amplitude-controlled trapezoidal wave generating circuit including first and second current sources connected in series and in parallel with a wave-forming capacitor, respectively, and capable of being selectively turned on and off, with current values thereof being variable in interlinked relation with each other, a voltage detection means for detecting a voltage of said wave-forming capacitor, and a timing control means triggerable by an output of said voltage detection means for generating first and second timing signals,
   said timing control means including a charge/discharge means, a timing control capacitor, first and second voltage detection means for detecting a first timing and a second timing, respectively, by a voltage level of said timing control capacitor; said voltage detection means for detecting the voltage of said wave-forming capacitor; a latch means triggered by said second voltage detection means; and a reset means for resetting said timing control capacitor, whereby one of a logical product and a logical sum of the respective outputs of said latch means and said first voltage detection means is used as said first timing signal and the output of said latch means is used as said second timing signal,
   whereby the end timing of the operation of said first current source and the start timing of the operation of said second current source are controlled by said timing control means, and the and timing of the operation of said second current source is controlled by a voltage level of said wave-forming capacitor,
   said amplitude-controlled trapezoidal wave generating circuit further including a third current source whose current value is variable in interlinked relation with the respective current values of said first and second current sources, whereby the amplitude of said trapezoidal wave produced on said wave-forming capacitor is limited by a voltage drop generated by a current value of said third current source and an impedance element.

6. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   said DC power source being connected between said intermediate tap of said primary winding and a junction of said first and second switching elements;
   regenerative diodes connected in parallel with said first and second switching elements, respectively;
   a filtering capacitor connected in parallel with a selected one of said primary and secondary windings of said transformer and cooperating with leakage inductance of said transformer to form an LC filter; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by causing a capacitor to be charged and discharged, respectively, through two current sources connected respectively in series and in parallel with said capacitor and capable of being selectively turned on and off.

7. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   said DC power source being connected between said intermediate tap of said primary winding and a junction of said first and second switching elements;
   regenerative diodes connected in parallel with said first and second switching elements, respectively;
   a filtering capacitor connected in parallel with a selected one of said primary and secondary windings of said transformer and cooperating with leakage inductance of said transformer to form an LC filter; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by an amplitude-controlled trapezoidal wave generating circuit which includes: first and second current sources connected in series and in parallel with a wave-forming capacitor, respectively, and capable of being selectively turned on and off, with current values thereof being variable in interlinked relation with each other; a voltage detection means for detecting a voltage of said wave-forming capacitor; and a timing control means triggerable by an output of said voltage detection means for generating a first and a second timing signals, whereby the end timing of the operation of said first current source and the start timing of the operation of said second current course are controlled by said timing control means, and the end timing of the operation of said second current source is controlled by a voltage level of said wave-forming capacitor.

8. A non-resonance type AC power source apparatus comprising:
   a DC power source;
   a transformer having primary and secondary windings, said primary winding being provided with an intermediate tap;
   first and second switching elements connected in inverse-series across said primary winding of said transformer;
   said DC power source being connected between said intermediate tap of said primary winding and a junction of said first and second switching elements;
   regenerative diodes connected in parallel with said first and second switching elements, respectively;
   a filtering capacitor connected in parallel with a selected one of said primary and secondary windings of said transformer and cooperating with leakage inductance of said transformer to form an LC filter; and
   means for applying a time-ratio-modulated high frequency pulse to said first and second switching elements alternately at every half period of an output period of said transformer, said output period being set to be longer than a period of said high frequency pulse,
   said high frequency pulse being time-ratio-modulated by a trapezoidal wave obtained by an amplitude-controlled trapezoidal wave generating circuit including first and second current sources connected in series and in parallel with a wave-forming capacitor, respectively, and capable of being selectively turned on and off, with current values thereof being variable in interlinked relation with each other, a voltage detection means for detecting a voltage of said wave-forming capacitor, and timing control means triggerable by an output of said voltage detection means for generating first and second timing signals, whereby the end timing of the operation of said second current source is controlled by a voltage level of said wave-forming capacitor,
   said timing control means including a charge/discharge means, a timing control capacitor, first and second voltage detection means for detecting a first timing and a second timing, respectively, by a voltage level of said timing control capacitor; said voltage detection means for detecting the voltage of said wave-forming capacitor, a latch means triggered by said second voltage detection means, and a reset means for resetting said timing control capacitor, whereby one of a logical product and a logical sum of the respective outputs of said latch means and said first voltage detection means is used as said first timing signal and the output of said latch means is used as said second timing signal.

9. A non-resonance type AC power source apparatus comprising:
a DC power source;
a transformer having primary and secondary windings, said primary winding being provided with an intermediate tap;
first and second switching elements connected in inverse-series across said primary winding of said transformer;
said DC power source being connected between said intermediate tap of said primary winding and a junction of said first and second switching elements;
regenerative diodes connected in parallel with said first and second switching elements, respectively;
a filtering capacitor connected in parallel with a selected one of said primary and secondary windings of said transformer and cooperating with leakage inductance of said transformer to form an LC filter; and
means for applying a time-ratio-modulated high frequency pulse to said first and second switching elements alternately at every half period of an output period of said transformer, said output period being set to be longer than a period of said high frequency pulse,
said high frequency pulse being time-ratio-modulated by a trapezoidal wave obtained by an amplitude-controlled trapezoidal wave generating circuit including first and second current sources connected in series and in parallel with a wave-forming capacitor, respectively, and capable of being selectively turned on and off, with current values thereof being variable in interlinked relation with each other, and a third current source whose current value is variable in interlinked relation with the respective current values of said first and second current sources, whereby the amplitude of said trapezoidal wave produced on said wave-forming capacitor by charging and discharging said wave-forming capacitor by said first and second current sources is limited by a voltage drop generated by a current value of said third current source and an impedance element.

10. A non-resonance type AC power source apparatus comprising:
a DC power source;
a transformer having primary and secondary windings, said primary winding being provided with an intermediate tap;
first and second switching elements connected in inverse-series across said primary winding of said transformer;
said DC power source being connected between said intermediate tap of said primary winding and a junction of said first and second switching elements;
regenerative diodes connected in parallel with said first and second switching elements, respectively;
a filtering capacitor connected in parallel with a selected on of said primary and secondary windings of said transformer and cooperating with leakage inductance of said transformer to form an LC filter; and
means for applying a time-ratio-modulated high frequency pulse to said first and second switching elements alternately at every half period of an output period of said transformer, said output period being set to be longer than a period of said high frequency pulse,
said high frequency pulse being time-ratio-modulated by a trapezoidal wave obtained by an amplitude-controlled trapezoidal wave generating circuit including first and second current sources connected in series and in parallel with a wave-forming capacitor, respectively, and capable of being selectively turned on and off, with current values thereof being variable in interlinked relation with each other, a voltage detection means for detecting a voltage of said wave-forming capacitor, and a timing control means triggerable by an output of said voltage detection means for generating first and second timing signals,
said timing control means including a charge/discharge means, a timing control capacitor, first and second voltage detection means for detecting a first timing and a second timing, respectively, by a voltage level of said timing control capacitor; said voltage detection means for detecting the voltage of said wave-forming capacitor, a latch means triggered by said second voltage detection means, and a reset means for resetting said timing control capacitor, whereby one of a logical product and a logical sum of the respective outputs of said latch means and said first voltage detection means is used as said first timing signal and the output of said latch means is used as said second timing signal,
whereby the end timing of the operation of said first current source and the start timing of the operation of said second current source are controlled by said timing control means, and the end timing of the operation of said second current source is controlled by a voltage level of said wave-forming capacitor,
said amplitude-controlled trapezoidal wave generating circuit further including a third current source whose current value is variable in interlinked relation with the respective current values of said first and second current source, whereby the amplitude of said trapezoidal wave produced on said wave-forming capacitor is limited by a voltage drop generated by a current value of said third current source and an impedance element.

* * * * *